(12) United States Patent
Borghei

(10) Patent No.: US 10,623,963 B2
(45) Date of Patent: *Apr. 14, 2020

(54) PROACTIVE SECURITY FOR MOBILE DEVICES

(71) Applicant: Apple Inc., Cupertino, CA (US)

(72) Inventor: Hooman Borghei, San Diego, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/158,195

(22) Filed: Oct. 11, 2018

(65) Prior Publication Data

US 2019/0149995 A1    May 16, 2019

Related U.S. Application Data

(63) Continuation of application No. 14/995,155, filed on Jan. 13, 2016, now Pat. No. 10,129,756, which is a continuation of application No. 12/637,640, filed on Dec. 14, 2009, now Pat. No. 9,258,715.

(51) Int. Cl.
| | |
|---|---|
| *H04W 12/12* | (2009.01) |
| *H04M 3/42* | (2006.01) |
| *H04M 1/725* | (2006.01) |
| *H04W 12/08* | (2009.01) |
| *H04W 4/14* | (2009.01) |
| *H04M 1/673* | (2006.01) |

(52) U.S. Cl.
CPC ....... *H04W 12/12* (2013.01); *H04M 1/72522* (2013.01); *H04M 3/42221* (2013.01); *H04W 12/08* (2013.01); *H04W 12/1206* (2019.01); *H04M 1/673* (2013.01); *H04M 1/72572* (2013.01); *H04M 1/72577* (2013.01); *H04W 4/14* (2013.01)

(58) Field of Classification Search
None
See application file for complete search history.

(56) References Cited

U.S. PATENT DOCUMENTS

| | | | |
|---|---|---|---|
| 6,542,729 | B1 | 4/2003 | Chmaytelli et al. |
| 6,782,251 | B2 | 8/2004 | Kagay |
| 8,618,913 | B1 | 12/2013 | Bailey et al. |
| 9,258,715 | B2 | 2/2016 | Borghei |
| 2003/0065934 | A1 | 4/2003 | Angelo et al. |
| 2004/0143750 | A1 | 7/2004 | Kulack et al. |
| 2005/0221800 | A1 | 10/2005 | Jackson et al. |

(Continued)

*Primary Examiner* — Scott B Christensen
(74) *Attorney, Agent, or Firm* — Dickinson Wright RLLP

(57) ABSTRACT

Methods, program products, and systems for proactively securing mobile devices are described. A mobile device can proactively determine whether the mobile device is associated with a security risk and the level of the security risk. Upon determining a security risk, the mobile device can transmit coordinates of its current geographic location to a server. To protect privacy of authorized users, the transmission can be disabled by entering a password. If multiple failed password attempts are detected, the mobile device can proactively increase a security level of the device, and selectively protect files or other content stored on the mobile device. In some implementations, the mobile device can be transitioned into a surveillance mode where the mobile device records or captures information associated with one or more of user actions, ambient sound, images, a trajectory of the device, and transmits the recorded or captured information to the network resource.

20 Claims, 13 Drawing Sheets

(56) References Cited

U.S. PATENT DOCUMENTS

| | | |
|---|---|---|
| 2006/0075263 A1 | 4/2006 | Taylor |
| 2006/0258333 A1 | 11/2006 | Yang et al. |
| 2007/0035390 A1 | 2/2007 | Thomas |
| 2007/0274461 A1 | 11/2007 | Bennett et al. |
| 2007/0294529 A1 | 12/2007 | Blair et al. |
| 2008/0005561 A1 | 1/2008 | Brown et al. |
| 2008/0052395 A1 | 2/2008 | Wright et al. |
| 2008/0120699 A1 | 5/2008 | Spear |
| 2008/0233919 A1 | 9/2008 | Kenney |
| 2009/0075630 A1 | 3/2009 | McLean |
| 2009/0247122 A1 | 10/2009 | Fitzgerald et al. |
| 2009/0249497 A1 | 10/2009 | Fitzgerald et al. |
| 2009/0280795 A1 | 11/2009 | O'Shaughnessy |
| 2010/0210240 A1 | 8/2010 | Mahaffey et al. |
| 2011/0141276 A1 | 6/2011 | Borghei |
| 2011/0225656 A1 | 9/2011 | Gruper et al. |
| 2016/0205556 A1 | 7/2016 | Borghei |

PROACTIVE SECURITY FOR MOBILE DEVICES

CROSS-REFERENCE TO RELATED APPLICATIONS

This application is a continuation of U.S. application Ser. No. 14/995,155, entitled "PROACTIVE SECURITY FOR MOBILE DEVICES" filed Jan. 13, 2016, now U.S. Pat. No. 10,129,756 issued Nov. 13, 2018, which is a continuation of U.S. application Ser. No. 12/637,640, entitled "PROACTIVE SECURITY FOR MOBILE DEVICES," filed Dec. 14, 2009, now U.S. Pat. No. 9,258,715 issued Feb. 9, 2016, the contents of which are incorporated herein by reference in their entirety for all purposes.

FIELD

This disclosure relates generally to mobile device security.

BACKGROUND

Mobile devices, such as phones and media devices, have a high risk of being lost or stolen. If a mobile device is stolen, the information contained on the device can be accessed. Various security methods have been developed to prevent unauthorized access of information stored on mobile devices. Some methods will encrypt the data to prevent access. Simple encryption ciphers can be broken and more secure encryption techniques are also more complex and thus require more resources that may not be available on some devices. Other security methods allow a remote wipe command to be sent to the mobile device over a network. The remote wipe command, however, wipes out all the data on the mobile device accept a boot file. This forces the user to have to restore the wiped data, which can be inconvenient and time consuming for the user.

SUMMARY

Methods, program products, and systems for proactively securing mobile devices are described. A mobile device can proactively determine whether the mobile device is associated with a security risk and the level of the security risk. Upon determining a security risk, the mobile device can transmit coordinates of its current geographic location to a network resource (e.g., a server). To protect privacy of authorized users of the mobile device, the transmission can be disabled by entering a password. If multiple failed password attempts are detected, the mobile device can determine that the device is currently being operated by an unauthorized user, and can proactively increase a security level of the device. Under the increased security level, files or other content stored on the mobile device can be selectively protected. In some implementations, the mobile device can be transitioned into a surveillance mode where the mobile device records or captures information associated with one or more of user actions, ambient sound, images, a trajectory of the device, and transmits the recorded or captured information to the network resource.

Proactive security for mobile devices technology can be implemented to achieve the following exemplary advantages. A user can be alerted that a mobile device is at security risk before the user notices the mobile device is lost or stolen. The user can remotely locate the lost or stolen mobile device on a map, or track the movement of the mobile device. To further help locating the mobile device, images and ambient audio can be recorded from the mobile device and sent to investigative authorities (e.g., the police).

The user can have granulated protection of data stored on the mobile device. The user can selectively wipe or scramble the data when the mobile device is lost or stolen. Thus, the user can avoid having to wipe the entire device clean when the whereabouts of the device is unknown. When the data are scrambled rather than wiped, if the user subsequently recovers the mobile device, the data can be unscrambled. The user will not face a complete loss of data.

Access to function and programs stored on a lost or stolen mobile device can be selectively limited before the device is recovered. For example, functions that can incur costs to the user (e.g., long distance phone calls, text messaging, and data access) can be disabled. Security breach to corporate network can be prevented, for example, by changing the VPN settings upon detection of security risk.

Technology for proactively securing a mobile device can protect a user's privacy by allowing an authorized user to disable transmission of private information from a mobile device when a malicious user requests the information, or when the mobile device misestimates a security risk. The authorized user can interrupt a transmission by entering an access password to the mobile device in response to a privacy warning.

When the mobile device detects activities that suggest unauthorized use, the mobile device can record or detect the activities. The recordings or detections can be used to aid the recovery of the device. For example, the device can provide location information to the authorized user as well as to the police.

The details of one or more implementations of proactive security for mobile devices are set forth in the accompanying drawings and the description below. Other features, aspects, and advantages of proactive security for mobile devices will become apparent from the description, the drawings, and the claims.

BRIEF DESCRIPTION OF THE DRAWINGS

Like reference symbols in the various drawings indicate like elements.

DETAILED DESCRIPTION

Proactive Security for Mobile Devices Overview

Figure 1A:
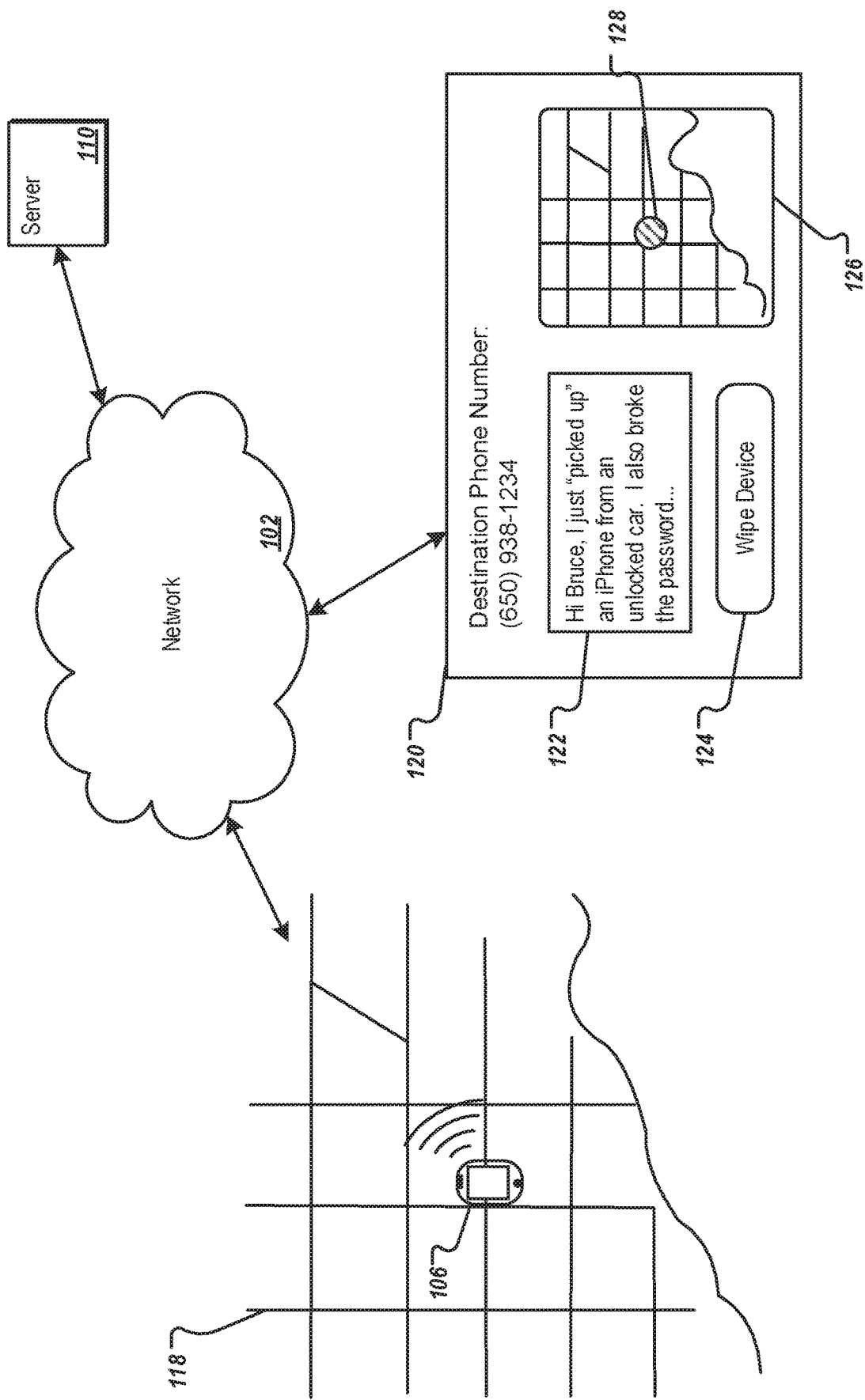
FIG. 1A illustrates an exemplary use case of proactive security for mobile devices techniques.

The backend of the user interface (e.g., a website) can be hosted by one or more servers 110, which implement proactive security for mobile devices techniques. Upon receiving the user security request through user interface 120, server 110 can communicate with mobile device over network 102 (e.g., the Internet). The communication can include, for example, sending one or more security commands that can trigger various security functions on mobile device 106. In response to the security commands, mobile device 106 can transmit its current geographic location coordinates (e.g., latitude, longitude, altitude) to a network resource 110 (hereafter also referred to as server 110). The geographic location coordinates can identify a current location of mobile device 106, which can be displayed on map 126 using location indicator 128.

In various implementations, some of the security functions on mobile device 106, as well as other security functions on server 110, can determine security risk factors of various security events. The security risk factor can be used to measure a likelihood that mobile device 106 is in the hands of an unauthorized user. The security risk factor can be used to alert the authorized user that mobile device 106 is likely stolen, as well as to proactively set mobile device 106 to a an appropriate secure operating mode to protect user data and to aid recovery.

In some implementations, the security risk factor can be determined based on passwords entered into mobile device 106. If repeated attempts to enter a correct password fail (e.g., a person tried ten times without succeeding), or passwords from a "blacklist" are entered, the security risk factor can be increased. The blacklist can include passwords that a rightful owner do not use (or is prevented from using), but the thief or hacker are tempted to try. For example, passwords "1234" or "abcd" can be in the blacklist.

In some implementations, a function that calculates a security risk factor can determine that device 106 is associated with a high security risk because a number of failed password attempts has exceeded a threshold number (e.g., 10 attempts). Upon determining that the security risk factor is high, and upon receiving a security command from server 110, mobile device 106 can determine that mobile device 106 is being used by an unauthorized person. Mobile device 106 can proactively invoke various functions that can protect data stored on mobile device 106 and aid the recovery of mobile device 106. User intervention (e.g., a user's command to report that mobile device is stolen), can, but is not required to, invoke the various functions.

In some implementations, mobile device 106 can record user actions and transmit the recorded information to server 110 after the security risk factor is high enough to indicate a high level of confidence that mobile device 106 is stolen. The recorded actions can include phone calls, attempted purchases, trajectory of mobile device 106, among others. For example, mobile device 106 can send a telephone number dialed as well as snippets of recorded telephone conversation to server 110. Ambient sound and digital images can also be recorded.

Upon receiving the recorded information, server 110 can provide the information for display in user interface 120 on the user's computer. For example, user interface 120 can display map 126, in which the geographical location of mobile device 106 can be indicated using indicator 128 (e.g., a dot, a circle, an icon, etc.). Actions performed on mobile device can be displayed in user interface 120 as well. For example, user interface 120 can display a telephone number dialed from mobile device 106, as well as transcript 122 of a recorded audio snippet of the telephone conversation. In some implementations, some portions of user interface 120 is hidden unless the user of user interface 120 has sufficient authorization (e.g., being authenticated as police).

Mobile device 106 can automatically protect user data using various data protection schemes when mobile device 106 detects a sufficiently high security risk. In addition, user interface 120 can provide various manual controls for the user to protect data on the mobile device. For example, button 124, if pressed, can cause server 110 to issue a security command to mobile device 106 to erase some or all user created data. Based on the information presented in user interface 120, the user can decide whether to perform a remote wipe to erase the data.

Figure 1B:
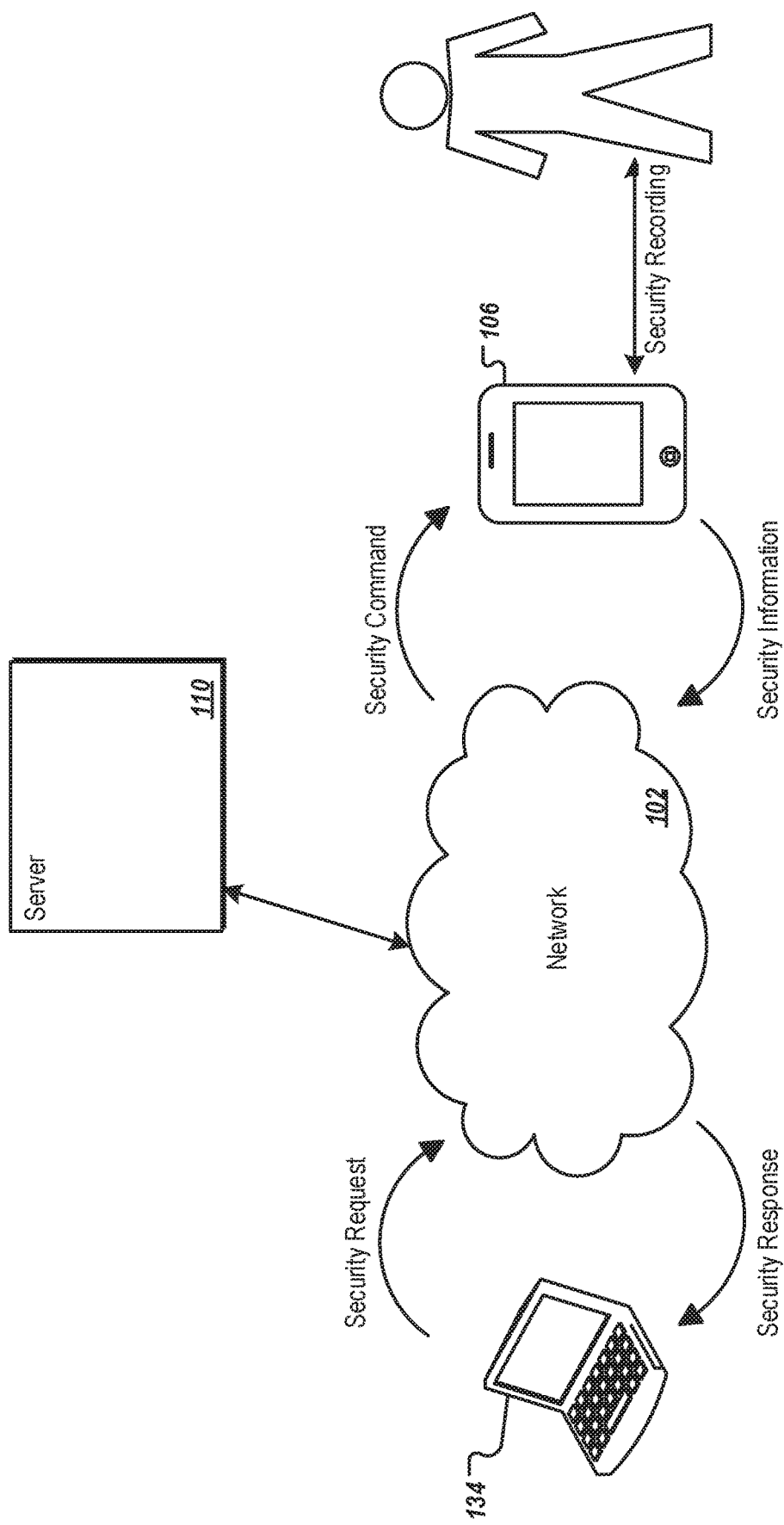
FIG. 1B illustrates an exemplary system implementing proactive security for mobile devices.

FIG. 1B illustrates an exemplary system implementing proactive security for mobile devices. User computer 134, server 110, and mobile device 106 are connected through communications network 102. Network 102 can be a voice network or a data network, or a combination of the two.

In some implementations, when a user suspects that mobile device 106 is lost or stolen, the user can access a user interface (e.g., user interface 120) provided by server 110. User interface 120 can be displayed on user computer 134 in a general-purpose client program (e.g., a web browser) or a specialized client program (e.g., a program installed for the dedicated purpose of managing mobile device security) that connects to server 110 through various protocols (e.g., TCP/IP). Through user interface 120, the user can send a security request to server 110 through network 102. The security request can be a general query on the location, usage statistics, battery status, and other information related to mobile device 106. The security request can also include instructions to configure the mobile device 106 based on user preferences. The security request can further include a user request to set mobile device 106 to various security modes.

Server 110, upon receiving the security request, can send a security command to mobile device 106. Server 110 can include one or more computers and various software for implementing proactive security functions. The software can be configured by, for example, user specified preferences on handling a security event. The security event can include a user security request, or an event that mobile device has entered a specific security mode, etc.

Upon receiving a security command from server 110, or upon determination (e.g., automatic determination) that a security event has occurred that is associated with a security risk factor, mobile device 106 can perform various security operations based on the risk factor. For example, mobile device 106 can send location information to server 110, display various warnings on a display device, or begin recording user actions and user conversations. Mobile device 106 can also selectively protect data stored on the device.

Mobile device 106 can send security information to server 110. The security information can include one or more sets of location coordinates, operating status of mobile device 106, and recorded user actions and user conversations. The operating status of the mobile device can include a security risk factor, battery level, whether mobile device 106 is in standby mode or in "on" mode, whether mobile device 106 is in a vertical orientation (e.g., when mobile device 106 is held in a person's hand) or a level orientation (e.g., when mobile device 106 is lying on a table). The security information can be encrypted before transmitted to server 110 using known encryption methods.

Server 110, upon receiving the security information, can decrypt and format the security information, and provide the information for display in user interface 120 on user computer 134. Formatting the security information can include extrapolating a path of mobile device 106 based on the set of location coordinates received from mobile device 106, transcribing recorded conversation using speech-to-text conversion software, and providing controls corresponding to the received security risk factor from which server 110 can receive user commands.

Exemplary Proactive Security Processes

Figure 2:
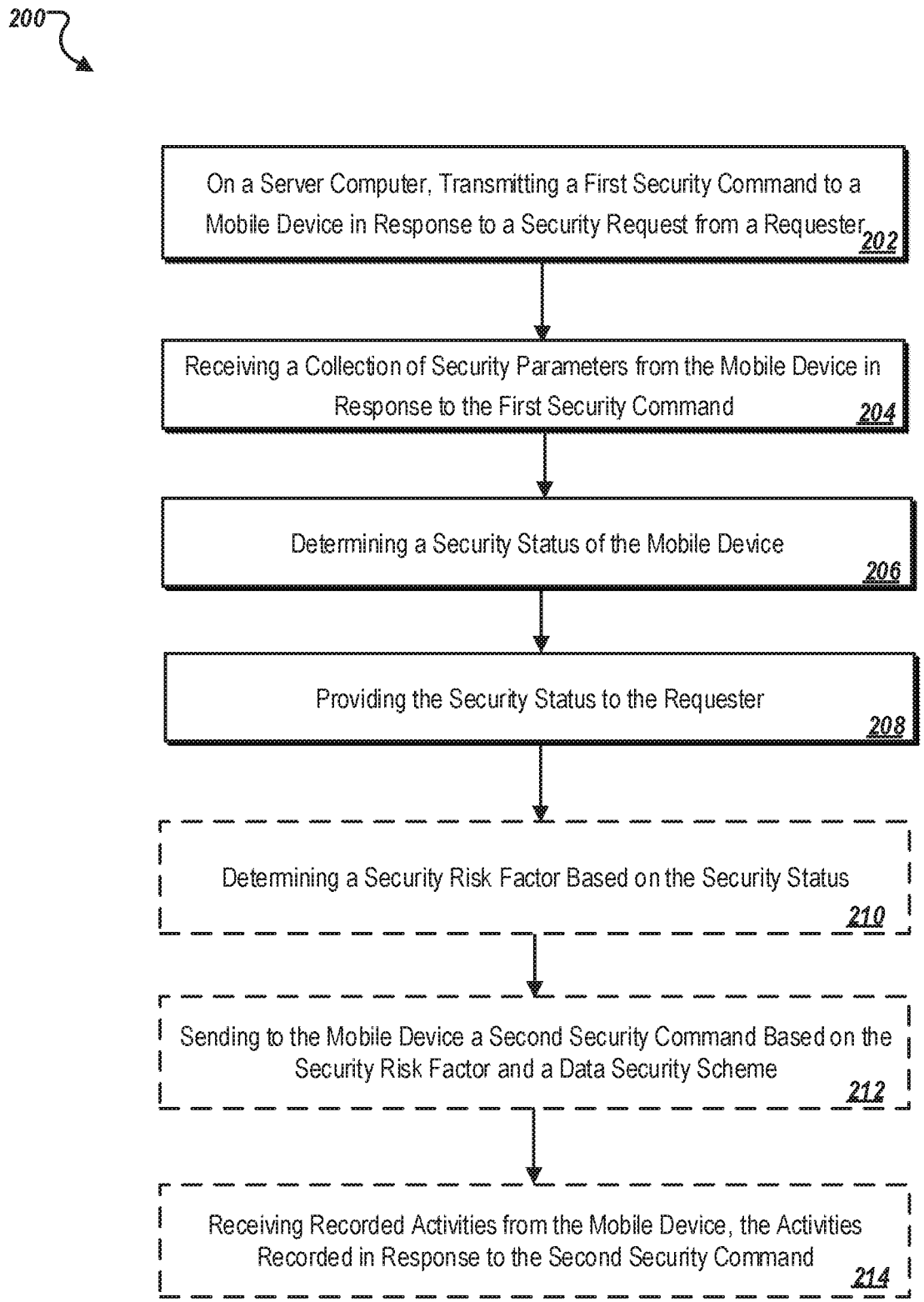
FIG. 2 is a flowchart illustrating an exemplary process of proactively securing mobile devices, executed on one or more servers.

FIG. 2 is a flowchart illustrating exemplary process 200 of proactively securing mobile devices, executed on one or more servers. For convenience, exemplary process 200 will be described in reference to server 110 that executes the process in conjunction with mobile device 106.

Server 110 can transmit (202) a security command to mobile device 106 in response to a security request from a requester. The requester can be an authorized user of mobile device 106 who possesses sufficient access privileges to manage security functions of mobile device 106, and who suspects that mobile device 106 is lost or stolen. The request can include one or more queries that request the security status of mobile device 106, or one or more security instructions for performing various security acts. The security command can include security queries and security commands. The security command can be transmitted using various known data "push" technologies through network 102.

Server 110 can receive (206) a collection of security parameters from mobile device 106 in response to the security request. The security parameters can be a list of values that can be used to determine whether mobile device 106 is being operated by a user who is not authorized to use mobile device 106. The security parameters can include a device identifier identifying mobile device 106. The device identifier can be any information that can uniquely identify mobile device 106. Some exemplary device identifiers can include a device's Media Access Control (MAC) address (e.g., "12:34:56:78:90:AB"), a MAC address of a network interface component in the device, or a Bluetooth ID (which can use an address in MAC format). Device identifiers can include a phone number, an international mobile equipment identity (IMEI) number, an integrated circuit card ID (IC-CID), or other forms of identification. Another example of an identifier of mobile device 106 is an international mobile subscriber identity (IMSI) which can be stored on a subscriber identify module (SIM) card.

In some implementations, the security parameters can further include an identifier of a device user (e.g., a wireless service subscriber using mobile device 106). In situations where mobile device 106 or server 110 has decided that a security breach has occurred or is likely to occur, the security parameters can include a user identifier of the person who is currently using mobile device 106. The user identifier can be extracted from the user's username when the user accesses individualized services (e.g., username that the user has used to access an online account).

In some implementations, the security parameters can include one or more sets of geographic coordinates of mobile device 106. The geographic coordinates can include latitudes, longitudes, and altitudes of mobile device 106. The geographic coordinates can be acquired using a Global Position System (GPS) that is built into or coupled with mobile device 106. In some implementations, the geographic coordinates can be generated by triangulation, where mobile device 106 can determine a current location using signals from various mobile network transmission towers whose locations are known. In some implementations, the coordinates can be estimated based on geographic location of a single transmission tower of a cellular network, when no other geographic location references are available to mobile device 106.

Server 110 can determine (206) a security status of mobile device 106 based on the security parameters. The security status can include an estimated current address of the current location of mobile device 106, whether mobile device is being connected to a secured destination (e.g., a VPN network), whether mobile device is being used to make a phone call, etc.

Server 110 can provide (208) the security status to the requester in response to the security request. Providing the security status to the requester can include displaying the security status and an explanation how the security status is derived on a display screen, as well as displaying the retrieved security parameters on the display screen. In some implementations, when the security status includes audio information, the audio information can be played to the requester or made otherwise accessible by the requester. For example, the audio information can be stored as an audio file. When the security status includes video information, the video information can be shown on screen.

In some implementations, server 110 can determine (210) a security risk factor based on the security status. The security risk factor can represent a level of confidence that mobile device 106 is safe or a level of confidence that mobile device 106 is at high risk.

In some implementations, server 110 can determine the security risk factor based on the security status determined for mobile device 106. For example, the security risk factor can be calculated based on a location of mobile device 106. Server 110 can include, or be connected to, a database that contains historical data on locations where theft rate is significantly higher than other areas. Server 110 can determine that mobile device 106 is safe because the estimated current address of mobile device 106 can be mapped to the requester's residence, or that mobile device 106 is at risk because the estimated current address of mobile device 106 maps to a known high-theft area, which has been identified using the database on server 110. In the latter case, server 110 can determine a high security factor (e.g. greater than 1.0) which can be used to set mobile device 106 to a higher secure mode of operation.

In some implementations, the security factor can be calculated based on abnormal use of mobile device 106. Server 110 can maintain data of musical preferences of the user of mobile device 106. The music preferences can be generated based on songs downloaded onto mobile device 106 through a period of time. Server 110 can generate a play list that corresponds to the songs downloaded using a rating system and collaborative filtering, which can be a process of filtering for information or patterns using techniques involving collaboration among multiple users. If server 110 detects a sudden change in music preferences (e.g. by noticing that mobile device 106 had only requested rap music downloads before, but is now requesting numerous downloads of Bach), server 110 can determine a high security risk factor. In some implementations, server 110 can use other multimedia usage patterns (e.g. movie or movie clip downloads, television channels watched, radio station tuned to, etc.) associated with mobile device 106 to determine whether an unauthorized user is accessing mobile device 106, and calculating the security risk factor accordingly.

The security risk factor can also be calculated based on a number of wrong passwords entered into mobile device 106, as described above. In various implementations, the security risk factor can be determined by a combination of various aspects (e.g. location, music preferences, and password).

Server 110 can send 212 to mobile device 106 a second security command based on the security risk factor and a data security scheme. The data security scheme can be a preconfigured action plan of responses corresponding to a metrics of given security events and given security risk factors. The responses can include deactivating or hiding user installed application programs on mobile device 106, deleting or scrambling at least a part of user data stored on mobile device 106, preventing mobile device 106 from starting up, and setting mobile device 106 in a secure mode of operation.

In some implementations, the second security command to mobile device 106 can prevent mobile device 106 from starting up. Mobile device 106 can operate in various operating states (e.g. on, off, or standby). The command can either set mobile device 106 to "off" mode, or force mobile device to stay in "standby" mode. In some implementations, if mobile device 106 is set to "standby" mode, mobile device 106 will not accept any user commands on the device (e.g. a display screen can be blank or displays a warning message, accepting no user input), neither will mobile device 106 accept any request from its wired interfaces (e.g. a request from a Universal Serial Bus (USB) interface). However, mobile device 106 can still be operative in the backend, and can receive further security commands from server 110.

In some implementations, the second security command to mobile device 106 can permit mobile device 106 to determine a level of secure mode of operation. In the secure mode of operation, mobile device 106 can impose various restrictions on accessing functions and data stored on mobile device 106. If the second security command sets mobile device 106 to a secure mode of operation, mobile device 106 can determine, independent of further server communications, actions to take based on user preferences stored on mobile device 106. Setting mobile device 106 to autonomous mode can be advantageous when, for example, mobile device 106 is taken out of a service area where server 110 can no longer maintain communication with mobile device 106.

In some implementations, when running in secure mode of operation, mobile device 106 can deny or limit access to certain programs. For example, mobile device 106 can block access to user installed programs (e.g. downloaded applications), and only allow standard system programs (e.g. a clock program) to run. Icons of the blocked programs can be hidden from display of mobile device 106, be displayed in a manner to indicate that the programs are blocked (e.g. grayed out), or be displayed normally but unlinked from the underlying program. Mobile device 106 can also allow a program to run, but limit the programs custom features. For example, a weather program installed by the user can remember multiple cities whose weather condition the user has queried, and present a list of the cities for display upon invocation of the weather program. Under secure mode of operation, the weather program can be allowed to execute, but the list of cities can be hidden from display.

In some implementations, when running in secure mode of operation, mobile device 106 can deny access to certain functions. For example, communication functions can be disabled or limited. Thus, phone call functions, messaging functions, web browsing functions on mobile device 106 can be disabled. In some implementations, these functions can be accessed only in limited circumstances. For example, when mobile device 106 is in a secure mode of operation, phone calls can be made from mobile device 106 only to emergency numbers (e.g. 911) or to designated numbers (e.g. a user's pre-configured home telephone number).

In some implementations, when running in a secure mode of operation, mobile device 106 can deny access to certain data. Data related to personalized information can be protected. Personalized information can include any information that relates to the user (e.g. a library of songs or a contact list) or to a group of users (e.g. a corporate internal network) that is not accessible by the public. Under a secure mode of operation, the data can be blocked (e.g. made inaccessible by the applications who created them), scrambled (e.g. encrypted), or erased.

The secure mode of operation can include various levels, each level corresponding to a set of restrictions. In various implementations, the levels of mode of operations can be user configurable, determined by server 110, or determined autonomously by mobile device 106. For example, a user can configure mobile device 106 to an exemplary "low security mode" using a security command sent from server 110. The "low security mode" can block user data from being accessed but does not encrypt or erase the data. The "low security mode" can be useful when the user believes that there is minimum security risk on mobile device 106, which was misplaced (e.g. left at a friend's house). The "low security mode" affords minimal protection (e.g. against the friend's curious children) while requires minimum effort to restore mobile device 106 to full function when the device is recovered. Mobile device 106 can set itself to low security mode if, for example, prior to and after receiving the security command setting mobile device to secure operation mode, mobile device 106 has not moved and no user action has occurred.

If mobile device 106 detects one or more unfamiliar acts (e.g. actions that have not been performed on mobile device 106 before), mobile device 106 can set itself to "medium security mode." Under "medium security mode," mobile device 106 can block access to various applications, and encrypt personalized data such that, for example, an average hacker cannot retrieve useful information from the personalized data, even if the hacker can reach the personalized data. "Medium security mode" can offer more protection than a "low security mode." However, the requester may need to spend more time to restore the data when mobile device 106 is recovered.

If mobile device 106 detects suspicious acts (e.g. a person tries to enter a password 10 times in a row without success), mobile device 106 can set itself to "high security mode" proactively or upon receiving the second security command sent from server 110. Under the "high security mode," mobile device 106 can block access to various applications, disable operating functions, and erase the personalized data such that, for example, an experienced hacker cannot plug mobile device 106 into a computer and access and descramble the personalized data using various software tools. In some implementations, the personalized data can be backed up on server 110 before they are wiped from mobile device 106. Furthermore, under the "high security mode," if mobile device 106 confirms that mobile device 106 is being operated by an unauthorized person, various surveillance functions can be turned on to aid the recovery of the device.

In some implementations, server 110 can receive (214) recorded activities on mobile device 106. In some implementations, server 110 can format the recorded action and present the information to the requester, an investigative organization, or both. The activities can be recorded in response to the second security command. An option to record user activities can be made available on user interface 120 to the requester if a high security risk factor is determined. An operation to record user activities can be activated if the second security command explicitly requests recording on mobile device 106. An operation to record user activities can also be activated if the second security command requires mobile device 106 to make the determination independently, and mobile device 106 subsequently detects highly suspicious activity (e.g. multiple unsuccessful tries on passwords).

FIGS. 3A-3D are flowcharts illustrating exemplary processes 300, 320, 350, and 360 of proactively securing mobile devices, executed on one or more mobile devices. For convenience, processes 300, 320, 350, and 360 will be described in reference to mobile device 106 that implements processes 300, 320, 350, and 360, and server 110.

Figure 3A:
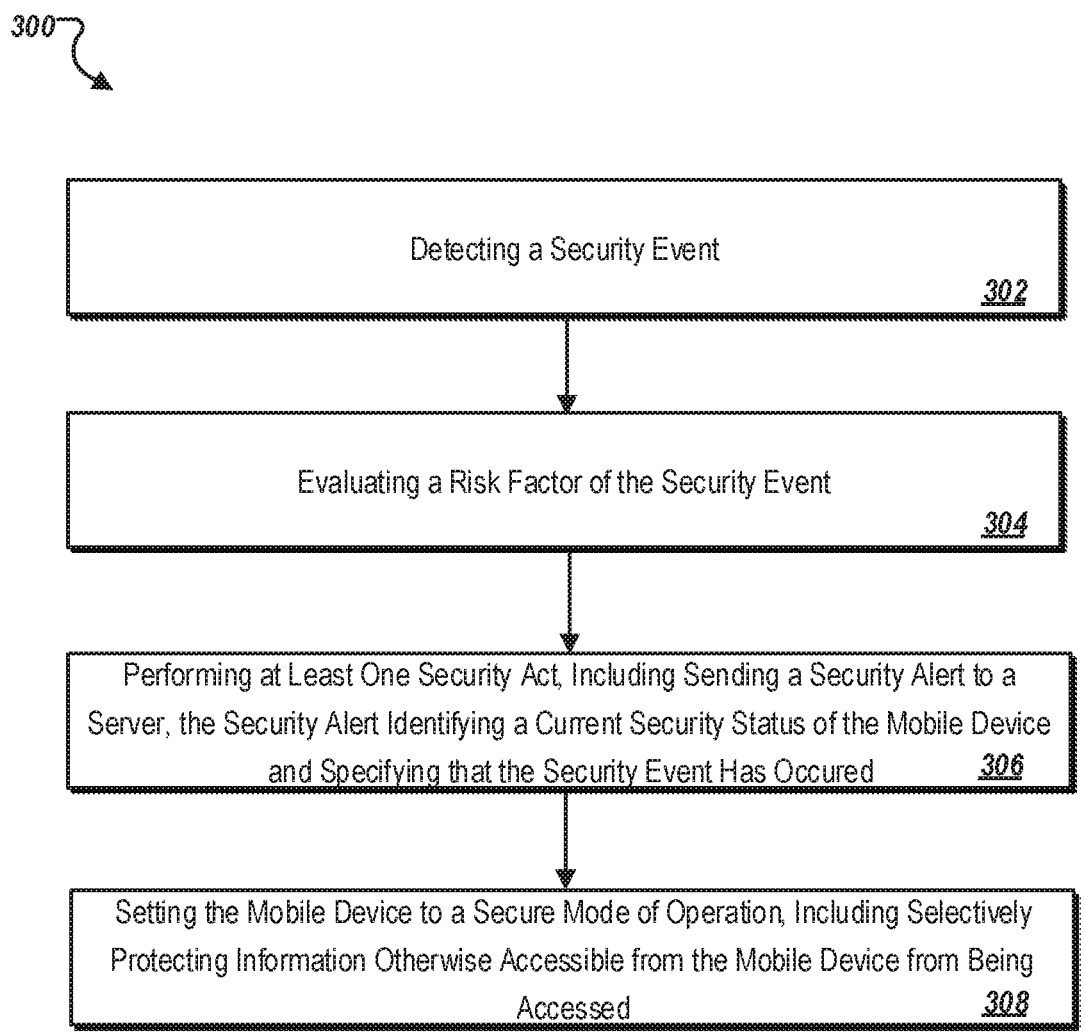
FIGS. 3A-3D are flowcharts illustrating exemplary processes of proactively securing mobile devices executed on one or more mobile devices.

FIG. 3A is a flow chart illustrating exemplary process 300 where a security act is performed on mobile device 106. Mobile device 106 can detect (302) one or more security events. A security event can include a message transmitted from server 110, or an event occurred on mobile device 106. For example, the security event can be a security command from server 110 (e.g. a security command inquiring a security status of mobile device 106, or setting mobile device 106 to operate in a particular secure operation mode). The security event can also be an event that has occurred locally to mobile device 106. For example, the security event can include multiple inputs of user passwords that do not match a correct user password (e.g. a user has entered wrong passwords consecutively for a number of times).

In some implementations, detecting the security event can include detecting an unrecognizable voice signature of a person making a phone call on mobile device 106. Voice signatures can be created on mobile device 106 based on pre-recorded voices of authorized users. A user of mobile device 106 can pre-record the user's voice, as well as voices of other users who are authorized to use mobile device 106, on mobile device 106. The pre-recording can be done, for example, by the user's reading a text into a microphone of mobile device 106. The text can be a standard text tailored for a voice signature program executing on mobile device 106. Mobile device 106 can create voice signatures of multiple users using an algorithm that can detect characteristics of the voices based on frequency and patterns. When a person makes a call on mobile device 106 and talks into the microphone, mobile device 106 can analyze a segment of the person's speech by generating a new voice signature, and comparing a pattern of the new voice signature to the stored voice signatures. If the new voice is determined not to belong one of the authorized users, mobile device 106 can determine that a security event has occurred.

Mobile device 106 can evaluate (304) a security risk factor of the security event. In some implementations, evaluating the security risk factor can include receiving a security factor sent from server 110. In some implementations, evaluating the security risk factor can be performed on mobile device 106, independent of the security risk factor calculated on server 110. The security factors calculated on mobile device 106 and server 110 can be compared. Results of the comparison can be used to confirm or dismiss a level of confidence that mobile device 106 is under security risk.

In some implementations, evaluating the security risk factor can include detecting whether there is a change of usage pattern of mobile device 106. The usage pattern can include a phone call history. For example, mobile device 106 can determine that no international phone calls have ever been made on mobile device 106. If a person is making an international phone call on mobile device 106 now, and a security event has occurred (e.g. mobile device 106 has received a security command raising a level of secure mode of operation, or the voice of the caller is not recognized), mobile device 106 can determine that a security risk factor needs to be further increased.

In some implementations, evaluating the security risk factor can include determining that a number of inputs of passwords that do not match the correct user password has exceeded a security threshold. Mobile device 106 can determine that at least some of the inputted user passwords are passwords in a "blacklist" (e.g. a list of high-risk passwords). Mobile device 106 can determine a risk of security breach based on the number of inputs and the inputted user passwords that are in the high-risk password list.

Mobile device 106 can perform (306) at least one security act, including sending a security alert to server 110. The security alert can identify a current security status of mobile device 106. The security alert can further specify that the security event has occurred. In some implementations, the security alert can be sent proactively (e.g. without a user's first requesting a status).

The security alert can include a geographic location of mobile device 106, as well as a description of the security event. The security alert can cause server 110 to communicate to a user of mobile device using preconfigured means. For example, if server 110 is being queried by the user, the security alert can be displayed to the user in a user interface. If server 110 is not being queried by the user (e.g. when the user has not realized that mobile device 106 is being used by another person), server 110 can initiate a communication by, for example, sending an electronic mail to the user, sending an instant text message to the user, or generating a telephone call to the user to a specified telephone number. The electronic mail address, instant text message identification, and telephone number can be pre-configured by the user.

The security act can include sending the security alert from mobile device 106 to server 110 after mobile device 106 has been inactive for a certain period of time, or battery level of mobile device 106 drops below a threshold. In some implementations, when mobile device 106 has been inactive for a certain period of time and the battery level drops below a threshold, mobile device 106 can proactively send a reminder to a user, indicating the location of mobile device 106 and reminding the user that mobile device 106 needs to be charged.

In some implementations, before sending the security alert to the user, server 110 can perform an independent analysis of security risks based on the security status and security event received from mobile device 106, to confirm or dismiss the security alert. For example, server 110 can determine that a user of mobile device 106 has recently purchased a new service plan that includes international telephone calls. In such cases, server 110 can determine that no security alert needs to be sent if the security event received from mobile device 106 is solely based on the fact that an international phone call was placed for the first time on mobile device 106.

In some implementations, not all information in the security alert from mobile device 106 will be sent to the user. For example, the geographic location of mobile device 106 can be withheld until a mobile device 106 has presented a warning (e.g. by displaying a warning message, playing a warning sound, or vibrating) and given sufficient time for the current user to respond. If the current user enters a correct password, mobile device 106 can abort sending the security alert.

Mobile device 106 can be set (308) to a secure mode of operation, including selectively protecting information from being accessed according to an information protection scheme and the risk factor. In some implementations, not only data stored on mobile device 106, but also data accessible from mobile device 106, can be protected. For example, mobile device 106 can run a client program that connects to a corporate electronic mail server. Upon determination that the security risk factor is high, mobile device 106 can delete messages stored on mobile device 106 which have been downloaded from the corporate electronic mail server, as well as sending a request to the corporate electronic mail server, which can request the user to change passwords.

Figure 3B:
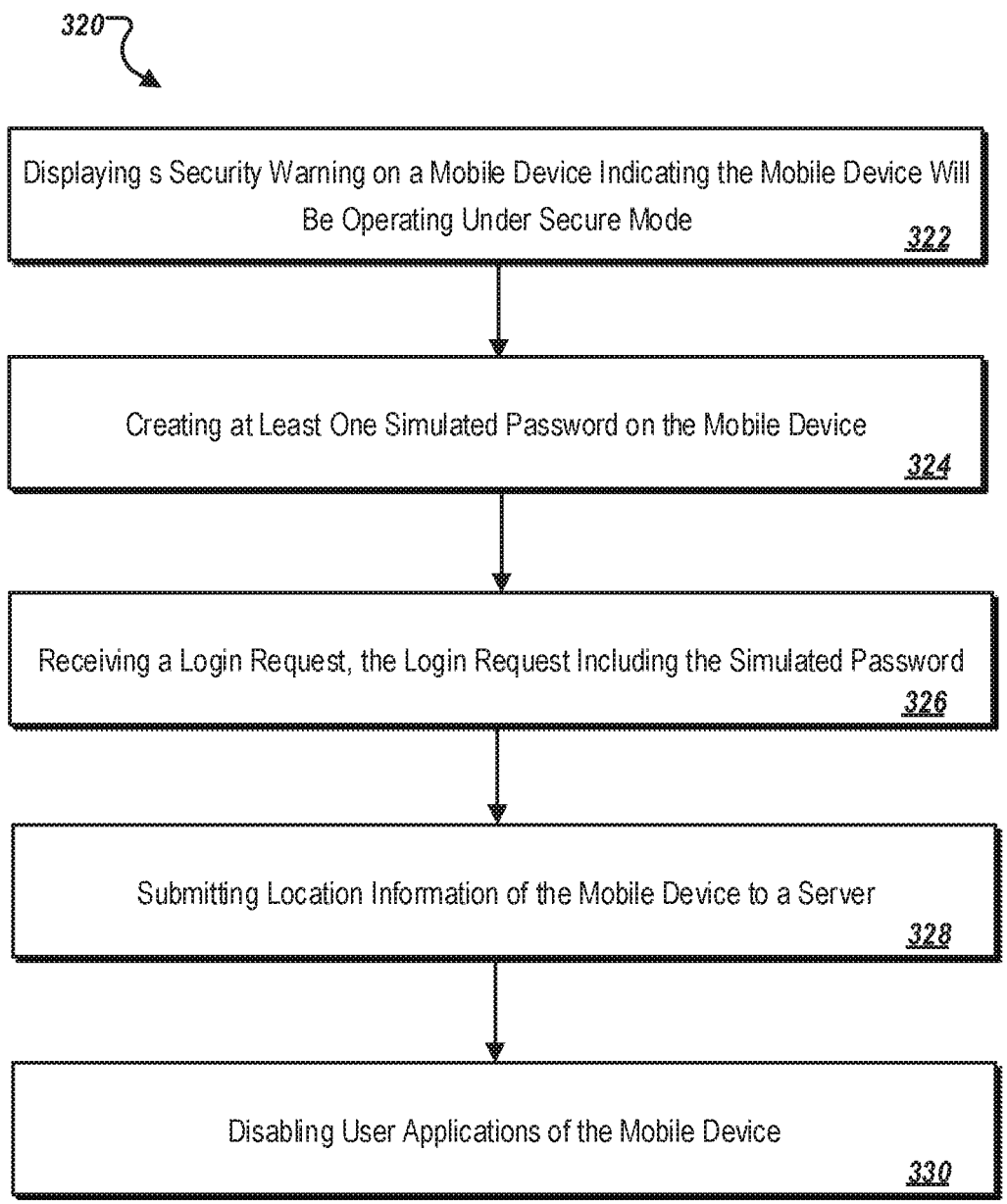

FIG. 3B is a flowchart illustrating exemplary process 320 in a security act where mobile device 106 transmits location information. Mobile device 106 can display (322) a warning indicating that mobile device 106 will be under a secure operating mode. The warning can indicate that geological location information or other information relating to the status of mobile device 106 (e.g. a phone call to a suspicious number) will be transmitted. The warning can give a current user an opportunity to prove the user's authorized identity and prevent disclosure of private information (e.g. the whereabouts of the current user) to a hacker who breaks into or otherwise abuses the security system and issues security queries solely for tracking an unsuspicious user. When mobile device 106 has high confidence that a person is operating mobile device 106 without authorization of the authorized owner of the device, mobile device can activate various data protection and action tracking mechanisms to protect the privacy of the authorized owner and to track the unauthorized use. In addition to displaying the warning, audio and physical signals (e.g. beeps and vibrations) can be present to ensure that the current user is aware of the recordings.

Mobile device 106 can create (324) at least one simulated password on the mobile device. Mobile device 106 can use the simulated password to create an illusion that the device is operating normally, while tracking user actions to aid the recovery of the device. The simulated password can be any passwords on a blacklist of passwords (e.g. "1111" or "abcd") that are tempting for a hacker to try. In some implementations, the simulated password can be a password that an authorized user cannot create. For example, when an authorized user creates a password on mobile device 106, a security evaluation function can calculate if the password is too simple and easily broken. The function can prevent the user from creating passwords such as "1111" or "abcd." Thus, the simple passwords "1111" and "abed" can be blacklisted. If a person enters a password on a black list for a number of times that exceeds a threshold, mobile device can create the simulated password using the next attempted password input.

In some implementations, the threshold can be adjusted based on the security risk factor calculated on server 110 and sent to mobile device 106. The security risk factor calculated on server 110 can be used as a reference when mobile device 106 autonomously calculates its own security risk factor. If, for example, the security factor sent from server 110 is high (e.g. when server 110 determines that mobile device 106 is in a high-risk neighborhood), the threshold can be lowered (e.g. the threshold can be set to five entries, instead of ten).

For example, a hacker has tried "1111," "1234," "abed," etc. all in a password blacklist for numerous times. Each time the user enters a blacklisted password, mobile device 106 can treat the entry as a security event, and increase an existing security risk factor. Once the hacker has entered a blacklisted password for a certain number of times, mobile device 106 can create a simulated password and start tracking user actions. The simulated password can be any password in the blacklist. In some implementations, all blacklisted passwords can be designated as the simulated password.

Mobile device 106 can receive (326) a login request, the login request including the simulated password. For example, the login request can include password "9999" which is in the blacklist of passwords. Mobile device 106 will accept "9999" as the simulated password. In some implementations, stages 324 and 326 are interchangeable. For example, mobile device can designate any password the user enters as the simulated password.

Mobile device 106 can submit (328) geographic location information of mobile device 106 to server 110, including a current location and subsequent locations. For example, mobile device 106 can submit to server 110 a geological information at specific intervals (e.g. every five minutes), indicating a path or trajectory of mobile device 106. In some implementations, the path or trajectory of mobile device 106 can be presented to the authorized user. In some implementations, the path or trajectory can be submitted to an investigative organization.

Mobile device 106 can disable (330) some or all user applications stored on mobile device 106 or accessible from mobile device 106, block, encrypt, or wipe some or all user data stored on mobile device 106 or accessible from mobile device 106, and disable or modify various functions of mobile device 106.

Figure 3C:
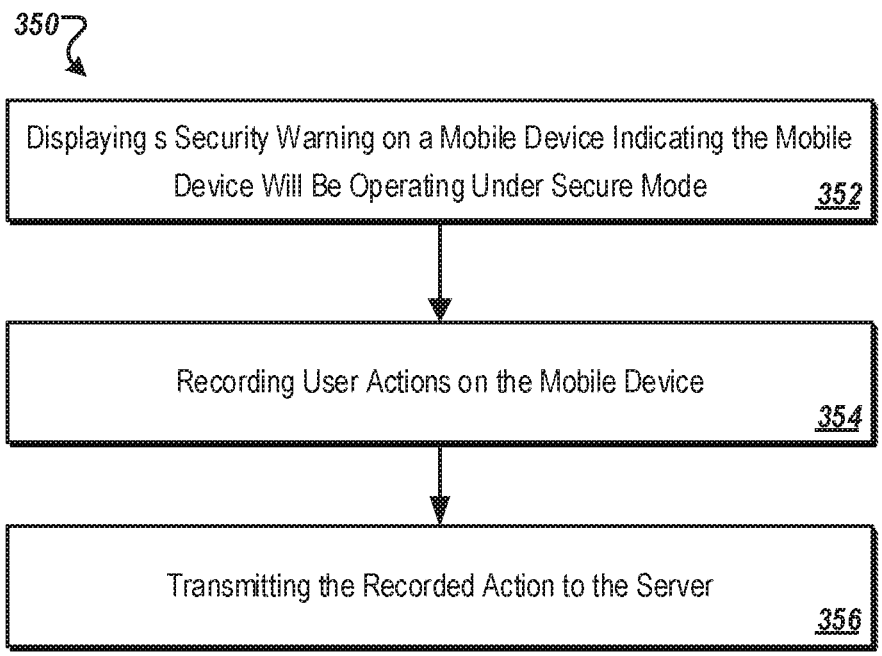

FIG. 3C is a flowchart illustrating exemplary process 350 in an exemplary security act where mobile device 106 records user actions. Mobile device 106 can display (352) a warning indicating that mobile device 106 will be under secure operating mode. The warning can indicate that further user actions on mobile device 106 (e.g. access to application programs or any phone calls) will be recorded. The warning can give a current user an opportunity to prove the user's authorized identity and prevent disclosure of private information before mobile device 106 records the user's actions. In addition to displaying the warning, audio and physical signals (e.g. beeps and vibrations) can be present to ensure that the current user is aware of the recordings. If, instead of providing sufficient credentials (e.g. correct password), the current user turns off mobile device 106 in response to the warning, the warning can resume when the current user turns mobile device 106 back on. Meanwhile, mobile device 106 can send a final message to server 110 before turning off, indicating to server 110 that mobile device 106 is turned off in response to the warning.

After the warning is shown, and if the current user fails to intervene, mobile device 106 can record user actions on mobile device 106. The recorded user actions can include a username and password entered by the user to secure websites, user entered address for map searches, instant text messaging content, pictures taken by the user, and segments of telephone conversations, among others. In some implementations, the warning is displayed periodically to constantly remind the user that the user's actions are being recorded.

In some implementations, mobile device 106 can record phone conversations after presenting a reminder that any telephone number dialed or conversations will be recorded. After the reminder has been displayed, if the user still proceeds to dial a telephone number, mobile device 106 can record the dialed number and subsequent conversation. Only snippets of the conversation can be recorded, and only the voice of the user of mobile device 106 can be recorded. In some implementations, instead of recording the conversation, mobile device can use voice analysis software to create a voice signature based on the voice received from the current user of mobile device 106. The voice snippets or voice signatures can be sent to server 110 for further analysis to aid the recapture of mobile device 106 by its authorized owner.

Mobile device 106 can transmit (356) the recorded action to server 110. Recorded activity can be transmitted from mobile device 106 to server 110 continuously, periodically, upon request, or upon completion of an activity recording. In some implementations, transmission can occur only when mobile device 106 receives a command from an authorized investigative organization.

Figure 3D:
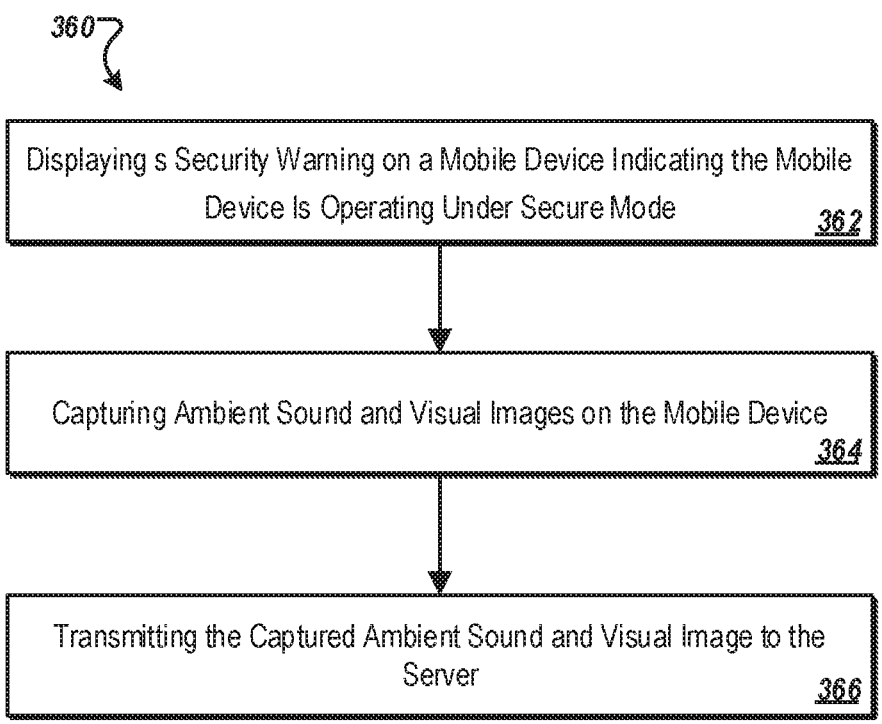

FIG. 3D is a flowchart illustrating exemplary process 360 where mobile device 106 records ambient sounds and images while operating in a surveillance mode. Mobile device 106 can display (362) a warning indicating that mobile device 106 will be operating under secure operating mode. The warning can indicate that ambient sound or images of mobile device 106 will be recorded. The warning can give a current user an opportunity to prove the user's identity and prevent disclosure of private information before mobile device 106 records the ambient audio or video. In addition to displaying the warning, audio and physical signals (e.g. beeps and vibrations) can be present to ensure that the current user is aware of the recordings.

After displaying the security warning, mobile device 106 can capture (364) visual images using a digital camera of mobile device 106. In addition, mobile device 106 can capture video clips of the surroundings of the device. Capturing the images or video clips can be triggered by an ambient light change of mobile device 106. For example, a picture can be taken when a sensor of mobile device 106 has detected a sudden increase in ambient light, indicating mobile device 106 is taken out of a pocket. Capturing the images or video clips can also be triggered by a change of orientation of mobile device 106. For example, a picture can be taken when a sensor of mobile device 106 has detected that mobile device has changed from a level position into an vertical position, indicating mobile device 106 is being picked up by a user. Mobile device 106 can capture ambient sounds associated with the images or video clips.

In some implementations, mobile device 106 can capture ambient sounds using a built-in microphone device independent of capturing the video. Mobile device 106 can start recording ambient sounds when mobile device 106 detects voice conversation.

Mobile device 106 can transmit (366) the captured ambient sound, image, and video clips to server 110. In some implementations, the recorded sound, image, and video clips are not presented to the user of mobile device 106 who issued a security request, but to one or more investigative organizations (e.g. the police) to aid the recovery of mobile device 106.

Exemplary User Interfaces of Proactive Security

Figure 4A:
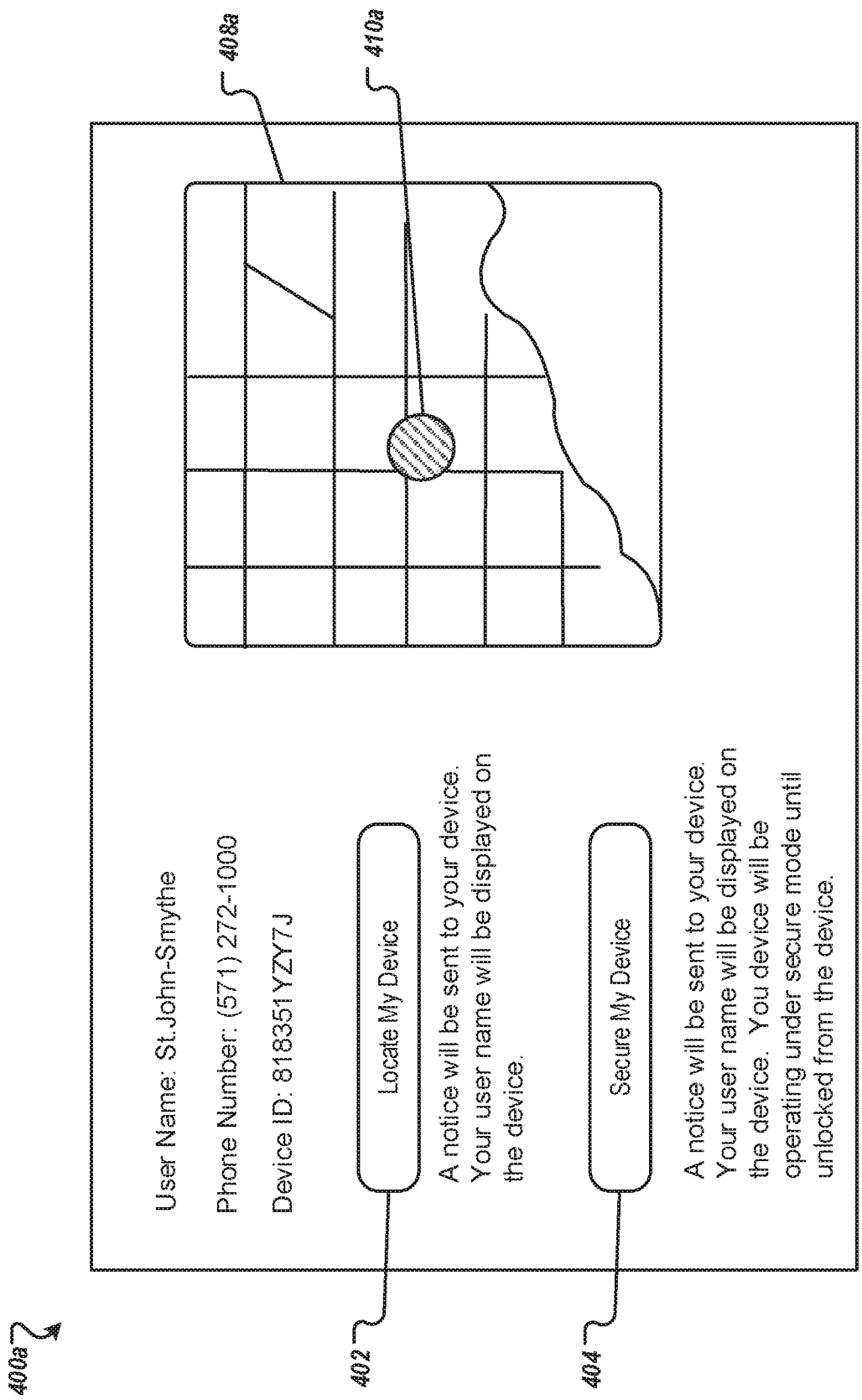
FIGS. 4A-4B illustrated exemplary user interfaces through which a user can remotely access security information of a mobile device.
Figure 4B:
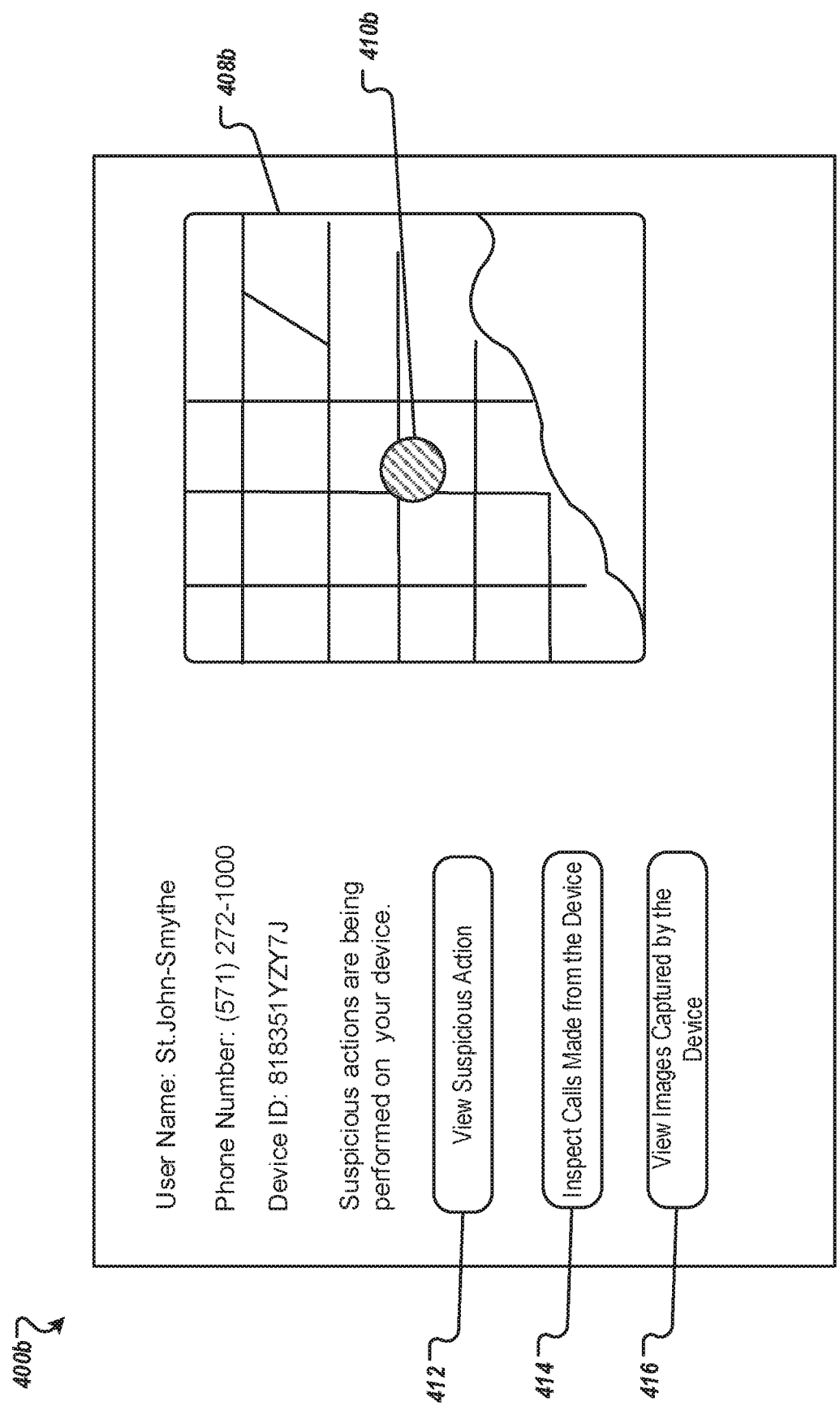

FIGS. 4A-4B illustrate exemplary user interfaces through which a user can remotely access security information of a mobile device. For convenience, the features of FIGS. 4A-4B will be described in reference to server 110 that can provide the user interfaces, user computer 134 that can display the interfaces, and mobile device 106.

FIG. 4A illustrates exemplary user interface 400a that allows a user to submit a security request. To access user interface 400a, a user can be required to provide sufficient credentials. The credentials can include a username and password to access a user account on server 110. The credentials can also include an Internet Protocol (IP) address of user computer 134, from which the user first created the user account or from which the user last successfully logged into the user account. If user computer 134 has a different IP address, server 110 can require further confirmation of the user's identity using other means (e.g. by requiring the user to enter extra credentials, or by requiring the user to call a particular phone number from a phone number that is on record).

User interface 400a can display the user name (e.g. "St. John-Smythe"), the phone number of mobile device 106 (if mobile device 106 has a phone number), and an identifier of the device (e.g. a serial number of mobile device 106). Multiple controls, such as pushbuttons, radio buttons, checkboxes, text fields, list boxes, dropdown lists, can be presented on user interface 400a. For convenience, a "locate my device" pushbutton 402 and a "secure my device" pushbutton 404 are shown in FIG. 4A. Other types of controls are possible for providing the same functionality of pushbuttons 402 and 404.

Pushbutton 402, when clicked or otherwise activated (e.g. from a key shortcut), can cause user computer 134 to send a security request to server 110. Server 110, in response, can send a security command to mobile device 106. In some implementations, the security command can be a phone call that can trigger an automatic response from mobile device 106. The location of mobile device 106 can be determined, for example, by triangulating the response from mobile device 106. In some implementations, the security command can be a data command that invoke various security functions on mobile device 106.

Once server 110 receives a geographic location of mobile device 106, the location can be displayed on map 408a in user interface 400a. The location of mobile device 106 can be represented as circle 410a. Radius of circle 410a can reflect a precision with which mobile device 106 can be located. In some implementations, multiple locations of mobile device 106 can be displayed to show a path of travel of mobile device 106a. Map 408a and circle 410a that indicates the position can be displayed after a delay period before a user's activates pushbutton 402. During the delay period, a warning message can be displayed or otherwise shown on mobile device 106, to give an authorized user time to block the transmission of position information.

User interface 400a can include pushbutton 404 that allows the user to secure mobile device 106. Pushbutton 404 can active a second user interface that enables the user to select various levels of secure operation modes. The user can select a secure operation mode that the user feels most appropriate for the situation, for example, based on the location of mobile device 106. In some implementations, pushbutton 404 can cause server 110 to set mobile device 106 to an autonomous secure operation mode.

FIG. 4B illustrates exemplary user interface 400b that accept various user commands to perform various actions when a high-risk security event has occurred. In some implementations, viewing of user interface 400b can be limited to a user of an investigative organization. User interface 400b can include map 408b for displaying a current position of mobile device 106 (e.g. at circle 410b). User interface 400b can further include controls (e.g. pushbuttons) 412, 414, and 416. Controls 412, 414, 416 can be used to activate tracking functions on mobile device 106.

For example, pushbutton 412 can activate a user interface in which the a suspicious act, and reason why the act is suspicious, is displayed. An act is suspicious if server 110 or mobile device 106 has determined that mobile device 106 has high security risk related to the act (e.g. by a combination of factors that mobile device is located in a high crime area, has made suspicious phone calls, the caller's voice signature does not match any of authorized users, etc.). Pushbutton 414 can activate a user interface in which a list of phone numbers that mobile device has called recently, the duration of each phone call, and the geographic area of the destination number. The geographic area can be indicated by the area code of the destination number. In the user interface where the list of phone numbers is displayed, the user can select a phone number and listen to a snippet of the phone call or view a transcript of the snippet. Pushbutton 416 can active a user interface where images and video clips captured by mobile device 106 can be displayed. The user interface can also include controls for activating functions for playing the recorded ambient audio.

In some implementations, controls 412, 414, and 416 can be disabled until server 110 has determined that suspicious activity on mobile device 106 has occurred, and that the suspicious activity strongly indicates that mobile device 106 is being operated by an unauthorized person.

Figure 5A:
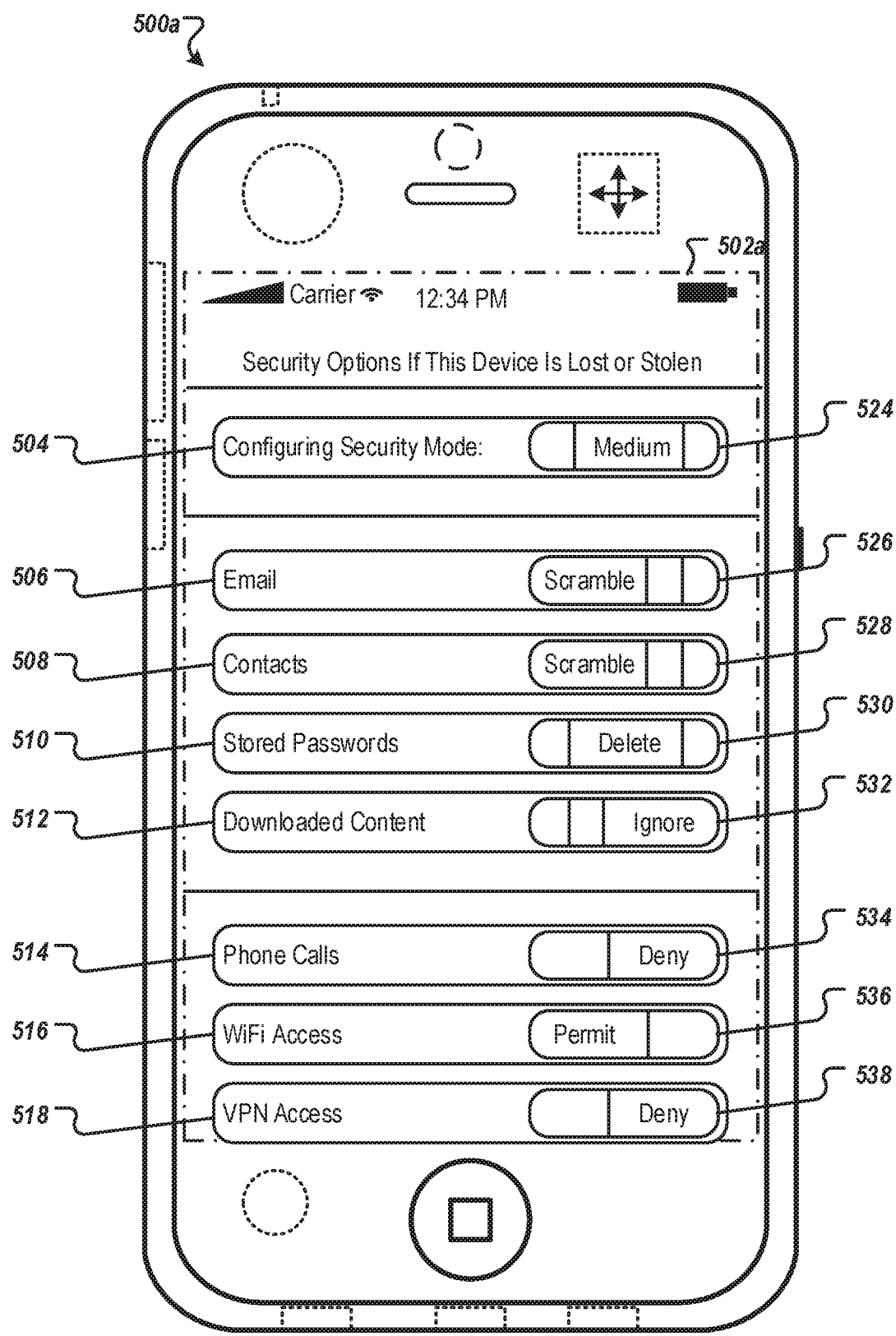
FIGS. 5A-5C illustrate exemplary user interfaces for proactively securing mobile devices.
Figure 5B:
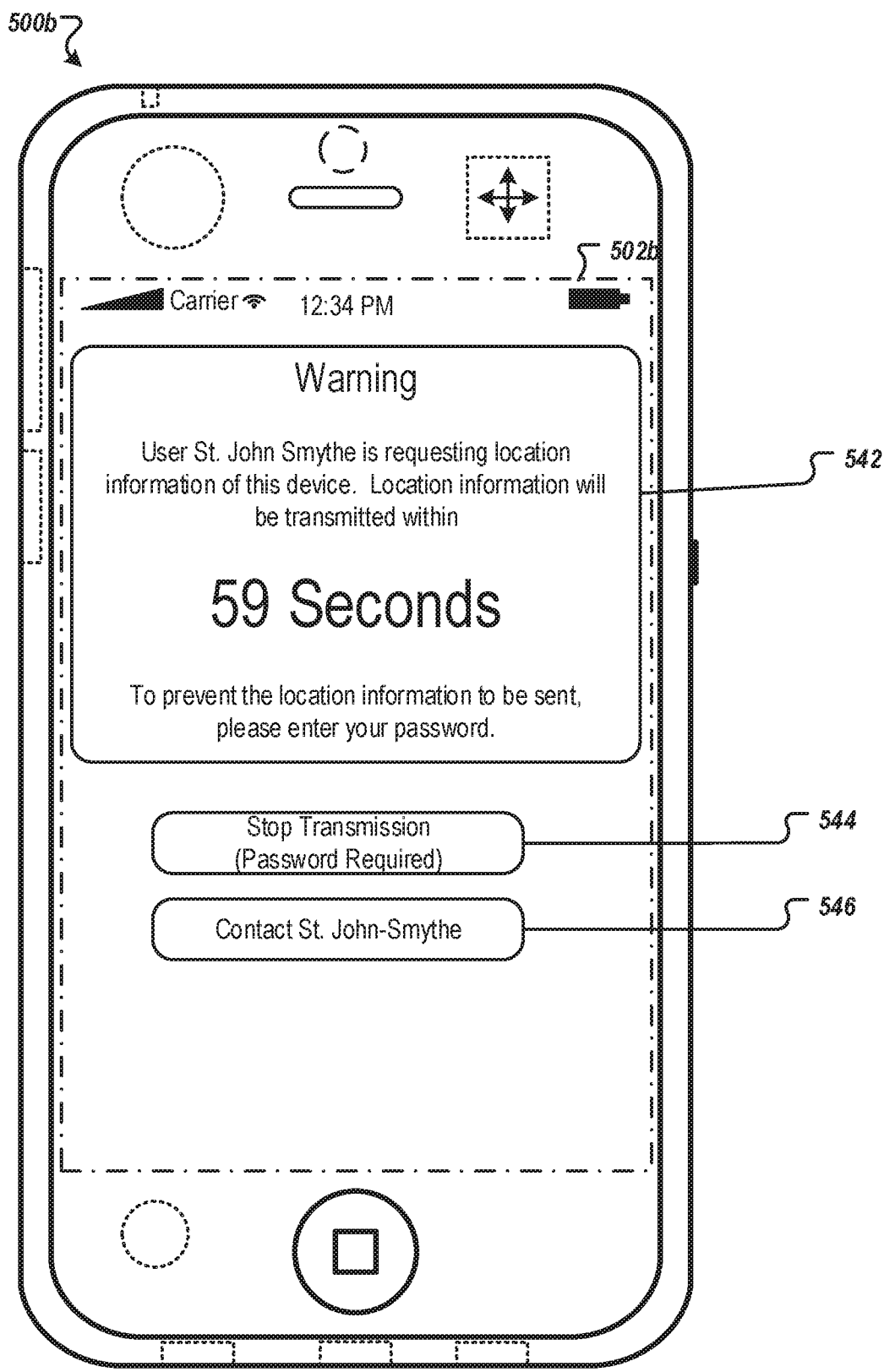
Figure 5C:
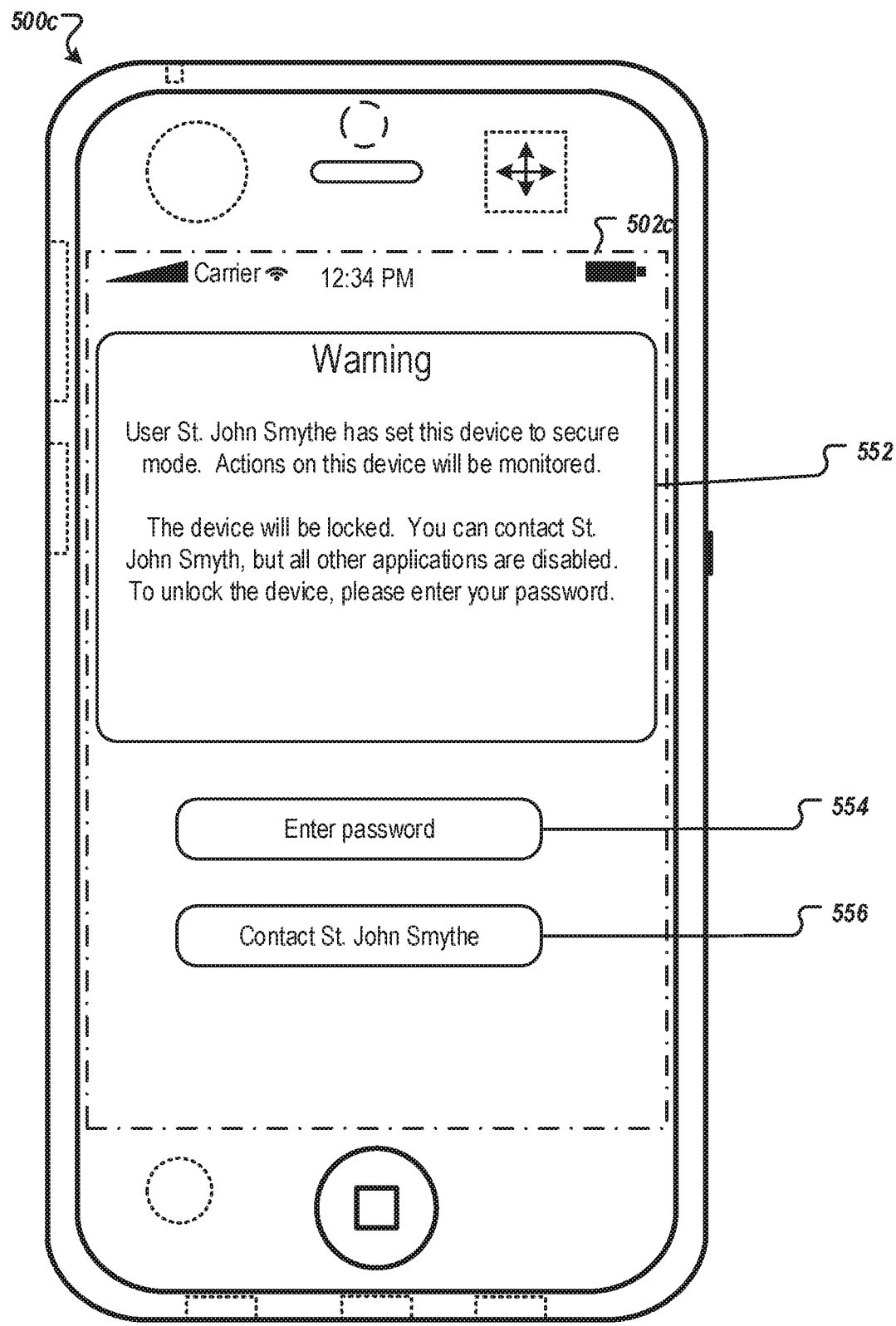

FIGS. 5A-5C illustrate exemplary user interfaces of proactively securing mobile devices, as displayed on mobile devices. FIG. 5A illustrates an exemplary user interface that allows a user to configure security settings of mobile device 500a. Mobile device 500a can be, for example, a handheld computer, a personal digital assistant, a cellular telephone, an electronic tablet, a network appliance, a camera, a smart phone, an enhanced general packet radio service (EGPRS) mobile phone, a network base station, a media player, a navigation device, an email device, a game console, or a combination of any two or more of these data processing devices or other data processing devices.

In some implementations, mobile device 500a can include touch-sensitive display 502 or pad. Touch-sensitive display 502 can implement liquid crystal display (LCD) technology, light emitting polymer display (LPD) technology, or some other display technology. Touch sensitive display 502 can be sensitive to haptic and/or tactile contact with a user.

In some implementations, touch-sensitive display 502 can be a multi-touch sensitive display 502. Multi-touch-sensitive display 502 can, for example, process multiple simultaneous touch points, including processing data related to the pressure, degree, and/or position of each touch point. Such processing facilitates gestures and interactions with multiple fingers, chording, and other interactions. Other touch-sensitive display technologies can also be used, e.g. a display in which contact is made using a stylus or other pointing device.

In some implementations, mobile device 500a can display one or more graphical user interfaces on touch-sensitive display 502 for providing the user access to various system objects and for conveying information to the user, e.g. a user interface for configuring security options when mobile device 500a is lost or stolen. The user can access the interface by providing a correct password. For illustrative purposes, the exemplary user interface is described with reference to a touch-sensitive screen on mobile device 500a. Other implementations are possible. Furthermore, the functions illustrated in FIG. 5A can also be performed on server 110 through a user interface displayed on user computer 134.

Control 504 allows a user to select a level of secure operation mode. Mobile device 500a, when operating under secure mode, can operate at various levels (e.g. low, medium, and high). Each level can have a distinct set of configurations. The user can tap on slide switch 524 using a finger or other pointing means to select which level to configure. When tapped on, slide switch 524 can slide left or right, indicating which current level is being configured.

Controls 506, 508, 510, and 512 can allow user to specify what data to protect in a security event at a particular level of secure operation mode. In the exemplary user interface of FIG. 5A, controls 506, 508, 510, and 512 correspond to the user's email data (e.g. email messages stored on mobile device 500a), contact list, stored passwords for accessing various web sites, and downloaded content (e.g. downloaded books, music, and movies). Slide switches 526, 528, 530, and 532 can allow a user to set each of the email data, contact list, stored, passwords, and downloaded content to various protection methods.

For example, slide switches 526 and 528 can be used to instruct mobile device 500a to set data protection on email messages and contact lists to scramble mode. Once mobile device 500a is set to medium level of secure operation mode, email messages and the contact list will be scrambled. When data are scrambled, the data can be encrypted such that the messages and contact list cannot be decrypted without additional authorization (e.g. from a customer service representative that has concluded that mobile device 500a is safely in the hands of a rightful owner). Slide switch 530 can be used to instruct mobile device 500a to set data protection on stored passwords to delete mode. Once mobile device 500a is set to a medium level of secure operation mode, password for accessing emails, websites, or online stores will be erased.

Slide switch 532 can be used to instruct mobile device 500a to ignore data protection on downloaded content. Once mobile device 500a is set to medium level of secure operation mode, downloaded content can still be freely accessible. For example, if a user has downloaded hundreds or thousands of songs onto lost mobile device 500a, the user may care more about not having to download the songs again if mobile device 500a is recovered than an unauthorized user of the mobile device 500a. Thus, to this particular authorized user, erasing all songs is not an optimum security option. The user can configure either server 110 or mobile device 500a to not delete and not encrypt the downloaded songs, even when mobile device 500a is in a high security mode.

Controls 514, 516, and 518 can be used to configure the connectivity to a data or voice network (e.g. network 102) from mobile device 500a. For example, controls 514, 516, and 518 can be used to permit or deny phone calls, WiFi access, and VPN access from mobile device 500a, respectively. Slide switches 534, 536, and 538 can each be set to a "permit" position or a "deny" position by a finger tap on touch sensitive screen 502a, or by a slide of any pointing means (e.g. a stylus) across slide switches 534, 536, and 538.

Other controls can be used to configure other security settings of mobile device 500a. For example, controls can be implemented to configure certain user downloaded application programs to be freely executable, to be visible but disabled, or to be invisible under a secure operation mode. More controls may be presented in the user interface than can be displayed on a single page on touch sensitive screen 502a. The user can scroll up and down or left and right by moving a finger or other pointing device across touch sensitive screen 502*a* to access the controls.

FIG. 5B illustrates an exemplary user interface that allows a user to intervene before location information of mobile device 500*b* is transmitted. Various security commands can require mobile device 500*b* to transmit location information to a server (e.g. server 110). To protect the privacy of a user of mobile device 500*b*, mobile device 500*b* can warn the user that a transmission of location information is imminent. The warning can include a voice warning (e.g. a ring tone being played), a physical warning (e.g. mobile device 500*b* vibrates), or a display warning, or all of the three combined. A warning message can be displayed in a messaging area 542 on a touch-sensitive display screen 502*b*. The user can be given a period of time to respond. The warning message can include information on who is requesting the location information as well as a countdown to the time when the location information will be sent.

An authorized user who knows the password of mobile device 500*b* can interrupt the count down by, for example tapping on button 544 to enter the password. The user can also contact the person requesting the location by tapping button 546. Upon tapping button 546, a call can be made to a default destination number. In addition, button 546 can activate a messaging interface such that the current user of mobile device 500*b* can communicate with the requester (e.g. by opening a chat window on mobile device 500*b* and on user interface 120 of the requester). If the current user does nothing, location information can be transmitted at the end of the count down as indicated in messaging area 542.

FIG. 5C illustrates an exemplary user interface that allows a user to unlock mobile device 500*c* when mobile device 500*c* is in secure operating mode. In certain security operating modes (e.g. surveillance mode), mobile device 500*c* can monitor user activities on the device, record audio snippets of conversations on phone calls of the device, and record ambient audio and digital images. To protect the privacy of a user of mobile device 500*c*, mobile device 500*c* can warn the user that a transmission of location information is imminent. The warning can include a voice warning (e.g. a ring tone being played), a physical warning (e.g. mobile device 500*c* vibrates), or a display warning, or all of the three combined. A warning message can be displayed in a messaging area 552 on a touch-sensitive display screen 502*c*. The warning message can indicate that actions on mobile device 500*c* will be recorded. The voice, physical, and display warning can be repeated periodically, to allow a user to interrupt the recording. For example, mobile device 500*c* can ring, vibrate, or display the warning message once every five minutes. Button 554 can allow the user to interrupt the monitoring by entering a correct password. Button 556 can allow the user to contact a requester.

Network Operating Environment

Figure 6:
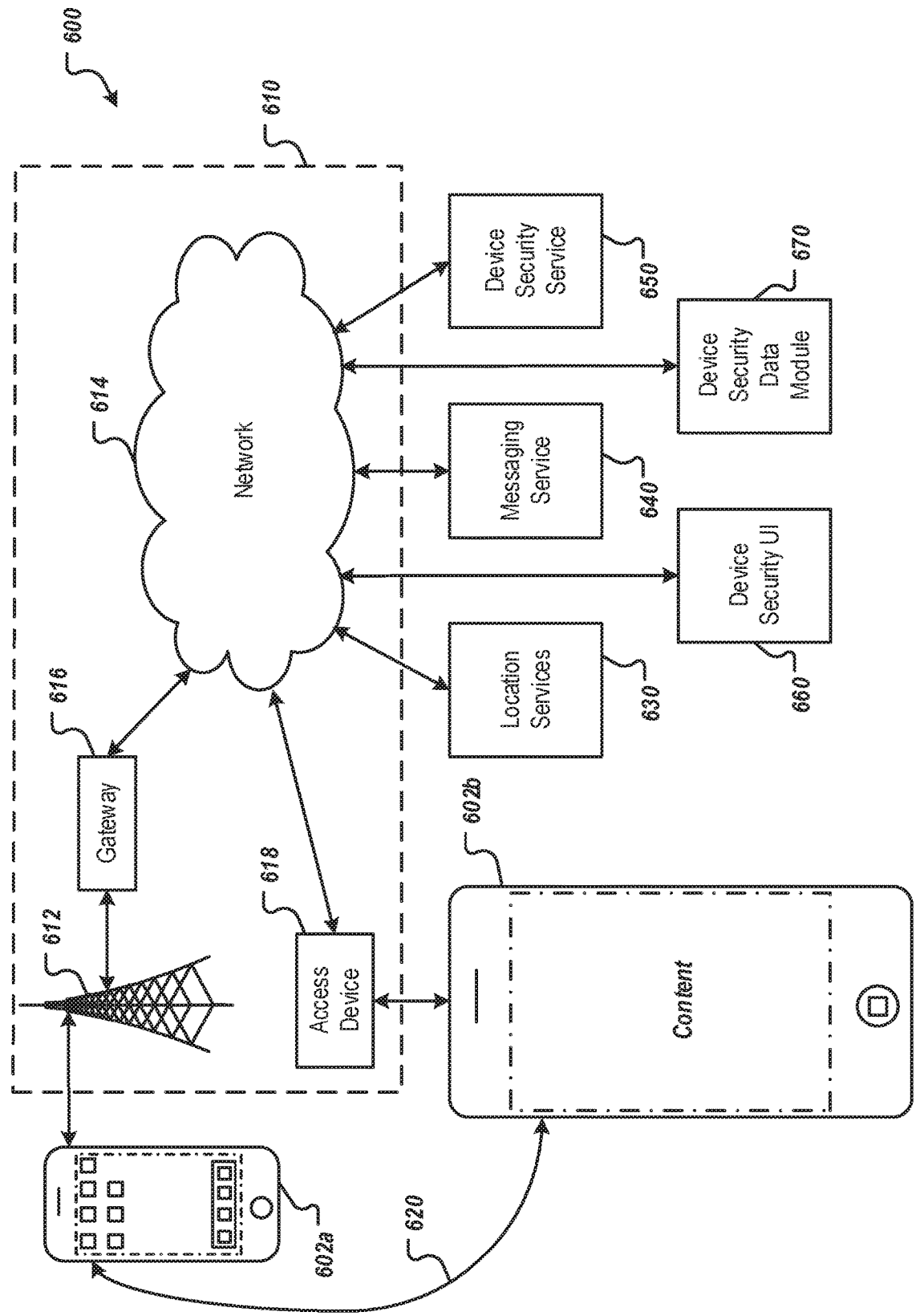
FIG. 6 is a block diagram illustrating an exemplary system architecture for implementing the features and operations described in reference to FIGS. 1-5.

FIG. 6 is a block diagram of an exemplary network operating environment for the mobile devices of 1-5. Mobile devices 602*a* and 602*b* can, for example, communicate over one or more wired and/or wireless networks 610 in data communication. For example, a wireless network 612, e.g. a cellular network, can communicate with a wide area network (WAN) 614, such as the Internet, by use of a gateway 616. Likewise, an access device 618, such as an 802.11g wireless access device, can provide communication access to the wide area network 614.

In some implementations, both voice and data communications can be established over wireless network 612 and the access device 618. For example, mobile device 602*a* can place and receive phone calls (e.g. using VoIP protocols), send and receive e-mail messages (e.g. using POP3 protocol), and retrieve electronic documents and/or streams, such as web pages, photographs, and videos, over wireless network 612, gateway 616, and wide area network 614 (e.g. using TCP/IP or UDP protocols). Likewise, in some implementations, the mobile device 602*b* can place and receive phone calls, send and receive e-mail messages, and retrieve electronic documents over the access device 618 and the wide area network 614. In some implementations, mobile device 602*a* or 602*b* can be physically connected to the access device 618 using one or more cables and the access device 618 can be a personal computer. In this configuration, mobile device 602*a* or 602*b* can be referred to as a "tethered" device.

Mobile devices 602*a* and 602*b* can also establish communications by other means. For example, wireless device 602*a* can communicate with other wireless devices, e.g. other mobile devices 602*a* or 602*b*, cell phones, etc. over the wireless network 612. Likewise, mobile devices 602*a* and 602*b* can establish peer-to-peer communications 620, e.g. a personal area network, by use of one or more communication subsystems, such as the Bluetooth™ communication devices. Other communication protocols and topologies can also be implemented.

The mobile device 602*a* or 602*b* can, for example, communicate with one or more services 630, 640, 650, 660, and 670 over the one or more wired and/or wireless networks. For example, one or more location services 630 can provide location information, e.g. determining a current location that corresponds to latitude, longitude, and altitude coordinates, location polling services, route tracking service, and other service and information, to mobile device 602*a* or 602*b*.

Messaging service 640 can, for example, provide e-mail and/or other messaging services (e.g. SMS). Messaging service 640 can allow a current user of a mobile device (e.g. device 602*a*) to communicate with a requester who requests location information of device 602*a*. Device security service 650 can, for example, provide functions for analyzing security events to determine security risk factor, sending security commands to mobile devices 602*a* and 602*b*, and processing security status information sent from mobile devices 602*a* and 602*b*.

Device security user interface 660 can, for example, accept user input for configuring security settings of mobile devices 602*a* and 602*b* as described in FIGS. 1-5 above. Device security user interface 660 can accept user requests of security status of mobile devices 602*a* and 602*b*, as well as presenting the security status sent from mobile devices 602*a* and 602*b* to the requester and/or investigative organizations. Device security data module 670 can, for example, store security schemes corresponding to various levels of secure operating modes of mobile devices 602*a* and 602*b*. Other services can also be provided, including a software update service that automatically determines whether software updates exist for software on mobile device 602*a* or 602*b*, then downloads the software updates to mobile device 602*a* or 602*b* where the software updates can be manually or automatically unpacked and/or installed.

Mobile device 602*a* or 602*b* can also access other data and content over the one or more wired and/or wireless networks. For example, content publishers, such as news sites, RSS feeds, web sites, blogs, social networking sites, developer networks, etc. can be accessed by mobile device 602*a* or 602*b*. Such access can be provided by invocation of a web browsing function or application (e.g. a browser) in response to a user touching, for example, a Web object.

Exemplary Mobile Device Architecture

Figure 7:
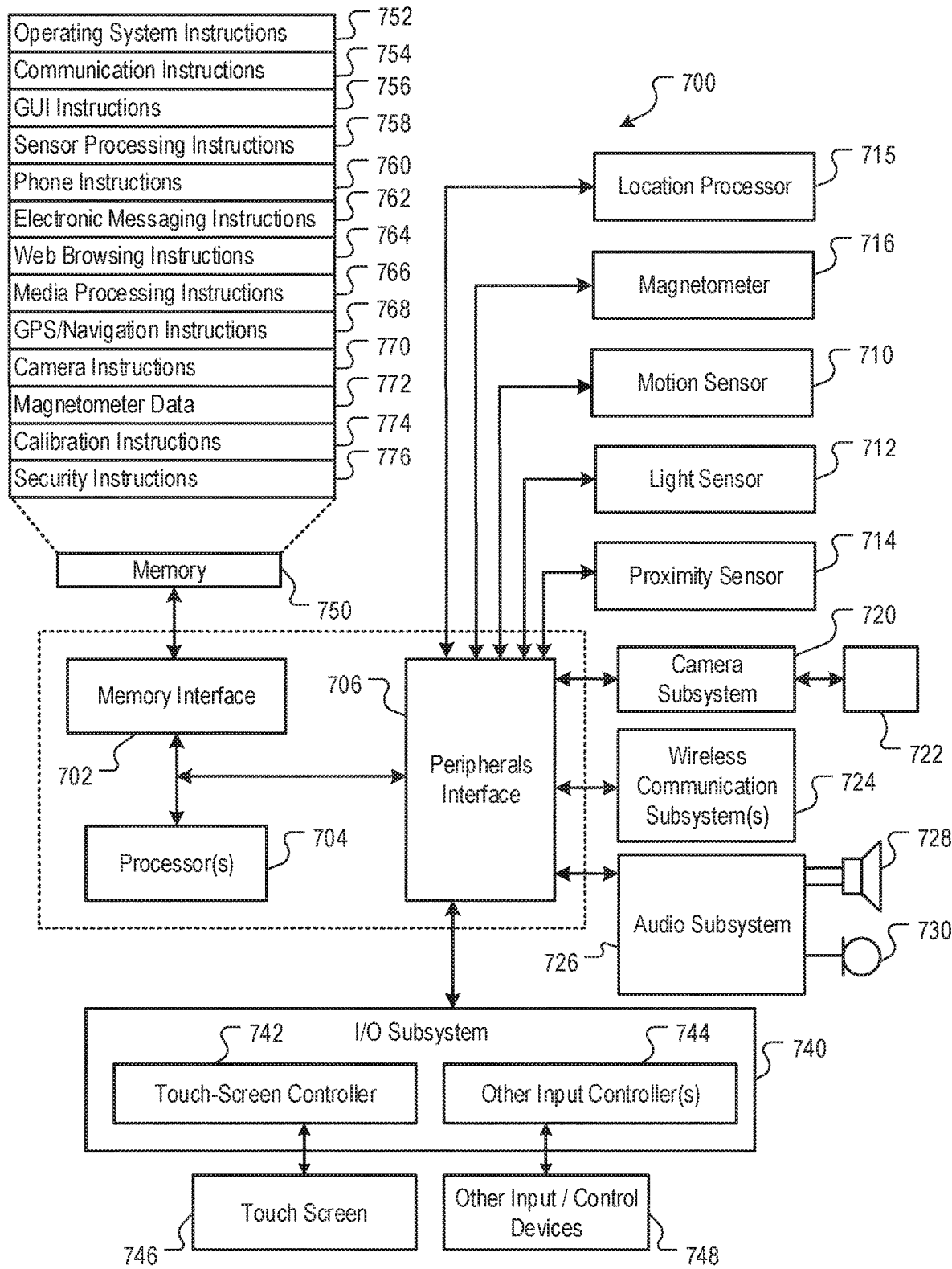
FIG. 7 is a block diagram illustrating an exemplary device architecture of a mobile device implementing the features and operations described in reference to FIGS. 1-6.

FIG. 7 is a block diagram of an exemplary architecture 700 for the mobile devices of FIGS. 1-6. A mobile device can include memory interface 702, one or more data processors, image processors and/or central processing units 704, and peripherals interface 706. Memory interface 702, one or more processors 704 and/or peripherals interface 706 can be separate components or can be integrated in one or more integrated circuits. The various components in a mobile device, for example, can be coupled by one or more communication buses or signal lines.

Sensors, devices, and subsystems can be coupled to peripherals interface 706 to facilitate multiple functionalities. For example, motion sensor 710, light sensor 712, and proximity sensor 714 can be coupled to peripherals interface 706 to facilitate orientation, lighting, and proximity functions of the mobile device. Location processor 715 (e.g. GPS receiver) can be connected to peripherals interface 706 to provide geopositioning. Electronic magnetometer 716 (e.g. an integrated circuit chip) can also be connected to peripherals interface 706 to provide data that can be used to determine the direction of magnetic North. Thus, electronic magnetometer 716 can be used as an electronic compass.

Camera subsystem 720 and an optical sensor 722, e.g. a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 724, which can include radio frequency receivers and transmitters and/or optical (e.g. infrared) receivers and transmitters. The specific design and implementation of the communication subsystem 724 can depend on the communication network(s) over which a mobile device is intended to operate. For example, a mobile device can include communication subsystems 724 designed to operate over a GSM network, a GPRS network, an EDGE network, a Wi-Fi or WiMax network, and a Bluetooth network. In particular, the wireless communication subsystems 724 can include hosting protocols such that the mobile device can be configured as a base station for other wireless devices.

Audio subsystem 726 can be coupled to a speaker 728 and a microphone 730 to facilitate voice-enabled functions, such as voice recognition, voice replication, digital recording, and telephony functions.

I/O subsystem 740 can include touch screen controller 742 and/or other input controller(s) 744. Touch-screen controller 742 can be coupled to a touch screen 746 or pad. Touch screen 746 and touch screen controller 742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 746.

Other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of speaker 728 and/or microphone 730.

In one implementation, a pressing of the button for a first duration may disengage a lock of the touch screen 746; and a pressing of the button for a second duration that is longer than the first duration may turn power to a mobile device on or off. The user may be able to customize a functionality of one or more of the buttons. The touch screen 746 can, for example, also be used to implement virtual or soft buttons and/or a keyboard.

In some implementations, a mobile device can present recorded audio and/or video files, such as MP3, AAC, and MPEG files. In some implementations, a mobile device can include the functionality of an MP3 player, such as an iPod™ A mobile device may, therefore, include a pin connector that is compatible with the iPod. Other input/output and control devices can also be used.

Memory interface 702 can be coupled to memory 750. Memory 750 can include high-speed random access memory and/or non-volatile memory, such as one or more magnetic disk storage devices, one or more optical storage devices, and/or flash memory (e.g. NAND, NOR). Memory 750 can store operating system 752, such as Darwin, RTXC, LINUX, UNIX, OS X, WINDOWS, or an embedded operating system such as VxWorks. Operating system 752 may include instructions for handling basic system services and for performing hardware dependent tasks. In some implementations, operating system 752 can include a kernel (e.g. UNIX kernel).

Memory 750 may also store communication instructions 754 to facilitate communicating with one or more additional devices, one or more computers and/or one or more servers. Memory 750 may include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GPS/Navigation instructions 768 to facilitate GPS and navigation-related processes and instructions; camera instructions 770 to facilitate camera-related processes and functions; magnetometer data 772 and calibration instructions 774 to facilitate magnetometer calibration. The memory 750 may also store other software instructions (not shown), such as security instructions, web video instructions to facilitate web video-related processes and functions, and/or web shopping instructions to facilitate web shopping-related processes and functions. In some implementations, the media processing instructions 766 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 750. In some implementations, security instructions 776 can be used to implement the proactive security features as described in FIGS. 1-6.

Each of the above identified instructions and applications can correspond to a set of instructions for performing one or more functions described above. These instructions need not be implemented as separate software programs, procedures, or modules. Memory 750 can include additional instructions or fewer instructions. Furthermore, various functions of the mobile device may be implemented in hardware and/or in software, including in one or more signal processing and/or application specific integrated circuits.

The features described can be implemented in digital electronic circuitry, or in computer hardware, firmware, software, or in combinations of them. The features can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method for remotely managing a mobile device, the method comprising, at a computing device:
   issuing a request to a host device to initiate a security procedure associated with the mobile device, wherein the request causes the host device to gather at least one security parameter from the mobile device;
   receiving, from the host device, information associated with (i) the at least one security parameter gathered by the host device, and (ii) a security risk factor calculated by the host device;
   displaying, based on the information, an option to select from one or more security commands; and
   in response to receiving a selection of a security command from the one or more security commands:
      causing the security command to be transmitted to the mobile device, wherein the security command causes the mobile device to:
         apply a first data security scheme that corresponds to the security command, wherein the first data security scheme is applied by carrying out a set of actions defined by the first data security scheme.

2. The method of claim 1, wherein the security command further causes the mobile device to enter a mode that enables the mobile device to autonomously apply a second data security scheme that is different from the first data security scheme when the mobile device identifies a condition that corresponds to the second data security scheme.

3. The method of claim 1, wherein the host device calculates the security risk factor based on the at least one security parameter.

4. The method of claim 1, wherein an action in the set of actions involves deactivating user installed programs on the mobile device and scrambling at least a portion of user data on the mobile device.

5. The method of claim 1, wherein an action in the set of actions involves erasing information user data stored on the mobile device.

6. The method of claim 1, wherein an action in the set of actions involves recording activities and transmitting information about the activities to at least one of the host device or the computing device.

7. The method of claim 1, wherein causing the security command to be transmitted to the mobile device comprises:
   issuing a second request to the host device to cause the host device to transmit the security command to the mobile device.

8. At least one non-transitory computer readable storage medium configured to store instructions that, when executed by at least one processor included in a computing device, cause the computing device to remotely manage a mobile device, by carrying out steps that include:
   issuing a request to a host device to initiate a security procedure associated with the mobile device, wherein the request causes the host device to gather at least one security parameter from the mobile device;

receiving, from the host device, information associated with (i) the at least one security parameter gathered by the host device, and (ii) a security risk factor calculated by the host device;

displaying, based on the information, an option to select from one or more security commands; and in response to receiving a selection of a security command from the one or more security commands:

causing the security command to be transmitted to the mobile device, wherein the security command causes the mobile device to:

apply a first data security scheme that corresponds to the security command, wherein the first data security scheme is applied by carrying out a set of actions defined by the first data security scheme.

9. The at least one non-transitory computer readable storage medium of claim 8, wherein the security command further causes the mobile device to enter a mode that enables the mobile device to autonomously apply a second data security scheme that is different from the first data security scheme when the mobile device identifies a condition that corresponds to the second data security scheme.

10. The at least one non-transitory computer readable storage medium of claim 8, wherein the host device calculates the security risk factor based on the at least one security parameter.

11. The at least one non-transitory computer readable storage medium of claim 8, wherein an action in the set of actions involves deactivating user installed programs on the mobile device and scrambling at least a portion of user data on the mobile device.

12. The at least one non-transitory computer readable storage medium of claim 8, wherein an action in the set of actions involves erasing information user data stored on the mobile device.

13. The at least one non-transitory computer readable storage medium of claim 8, wherein an action in the set of actions involves recording activities and transmitting information about the activities to at least one of the host device or the computing device.

14. The at least one non-transitory computer readable storage medium of claim 8, wherein causing the security command to be transmitted to the mobile device comprises:

issuing a second request to the host device to cause the host device to transmit the security command to the mobile device.

15. A computing device configured to remotely manage a mobile device, the computing device comprising:

at least one processor; and at least one memory storing instructions that, when executed by the at least one processor, cause the computing device to:

issue a request to a host device to initiate a security procedure associated with the mobile device, wherein the request causes the host device to gather at least one security parameter from the mobile device;

receive, from the host device, information associated with (i) the at least one security parameter gathered by the host device, and (ii) a security risk factor calculated by the host device;

display, based on the information, an option to select from one or more security commands; and in response to receiving a selection of a security command from the one or more security commands:

cause the security command to be transmitted to the mobile device, wherein the security command causes the mobile device to:

apply a first data security scheme that corresponds to the security command, wherein the first data security scheme is applied by carrying out a set of actions defined by the first data security scheme.

16. The computing device of claim 15, wherein the security command further causes the mobile device to enter a mode that enables the mobile device to autonomously apply a second data security scheme that is different from the first data security scheme when the mobile device identifies a condition that corresponds to the second data security scheme.

17. The computing device of claim 15, wherein the host device calculates the security risk factor based on the at least one security parameter.

18. The computing device of claim 15, wherein an action in the set of actions involves deactivating user installed programs on the mobile device and scrambling at least a portion of user data on the mobile device.

19. The computing device of claim 15, wherein an action in the set of actions involves recording activities and transmitting information about the activities to at least one of the host device or the computing device.

20. The computing device of claim 15, wherein causing the security command to be transmitted to the mobile device comprises:

issuing a second request to the host device to cause the host device to transmit the security command to the mobile device.

* * * * *

UNITED STATES PATENT AND TRADEMARK OFFICE
CERTIFICATE OF CORRECTION

PATENT NO. : 10,623,963 B2  
APPLICATION NO. : 16/158195  
DATED : April 14, 2020  
INVENTOR(S) : Hooman Borghei Page 1 of 1

It is certified that error appears in the above-identified patent and that said Letters Patent is hereby corrected as shown below:

In the Specification

At Column 11, Line 54: "Thus, the simple passwords "1111" and "abed"" can be" should read -- Thus, the simple passwords "1111" and "abcd" can be --.

At Column 12, Line 1: "For example, a hacker has tried "1111," "1234," "abed,"" should read -- For example, a hacker has tried "1111," "1234," "abcd," --.

Signed and Sealed this  
Eighth Day of February, 2022

Drew Hirshfeld  
*Performing the Functions and Duties of the*  
*Under Secretary of Commerce for Intellectual Property and*  
*Director of the United States Patent and Trademark Office*